United States Patent
Matsunaga et al.

(10) Patent No.: US 6,538,259 B2
(45) Date of Patent: Mar. 25, 2003

(54) STORAGE CONTAINER, STORAGE CONTAINER REFILLING SYSTEM, AND REFILLING METHOD

(75) Inventors: Kenichi Matsunaga, Kobe (JP); Ganji Abe, Kobe (JP); Kazuo Murakami, Kobe (JP); Kazuo Asada, Takasago (JP); Tadashi Shiraishi, Takasago (JP); Shigeru Kunishima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/180,299

(22) Filed: Jun. 27, 2002

(65) Prior Publication Data

US 2003/0028065 A1 Feb. 6, 2003

Related U.S. Application Data

(63) Continuation of application No. PCT/JP01/09719, filed on Nov. 7, 2001.

(30) Foreign Application Priority Data

Nov. 7, 2000 (JP) ........................................ 2000-339534

(51) Int. Cl.$^7$ ............................. G21F 5/00; G21C 19/00
(52) U.S. Cl. ................................. 250/506.1; 250/507.1; 376/272; 376/260
(58) Field of Search ........................... 250/506.1, 496.1, 250/507.1; 220/676, 23.88; 376/272, 261, 262, 260

(56) References Cited

U.S. PATENT DOCUMENTS

| 4,866,286 A | * | 9/1989 | Baatz et al. ............. 250/507.1 |
| 5,748,692 A | * | 5/1998 | Burton ........................ 376/272 |
| 5,920,602 A | * | 7/1999 | Botzem et al. ............. 376/272 |

FOREIGN PATENT DOCUMENTS

| JP | 11-84068 | * | 3/1999 |
| JP | 2001-242294 |   | 9/2001 |
| JP | 2007242294 | * | 9/2001 |
| JP | 2001-296392 | * | 10/2001 |

* cited by examiner

Primary Examiner—John R. Lee
Assistant Examiner—Jim Hughes
(74) Attorney, Agent, or Firm—Wenderoth, Lind & Ponack, L.L.P.

(57) ABSTRACT

A container body of a concrete cask includes a storage portion that stores a canister. A refilling system includes a reduction cylinder having an outside diameter smaller than the diameter of the storage portion and an inside diameter larger than the diameter of the canister, a first lift mechanism configured to raise and lower the reduction cylinder between a down position in the storage portion and an up position wherein it is drawn out of the storage portion, and a second lift mechanism having a holding portion for holding one end portion of the canister and configured to raise and lower the canister with respect to the container body. In refilling operations, the canister is loaded into and unloaded from the storage portion of the container body by the second lift mechanism with the reduction cylinder set in the storage portion.

12 Claims, 18 Drawing Sheets

STORAGE CONTAINER, STORAGE CONTAINER REFILLING SYSTEM, AND REFILLING METHOD

CROSS-REFERENCE TO RELATED APPLICATIONS

This is a continuation application of PCT Application No. PCT/JP01/09719, filed Nov. 7, 2001, which was not published under PCT Article 21(2) in English.

This application is based upon and claims the benefit of priority from the prior Japanese Patent Application No. 2000-339534, filed Nov. 7, 2000, the entire contents of which are incorporated herein by reference.

BACKGROUND OF THE INVENTION

1. Field of the Invention

This invention relates to a storage container for storing and keeping a radioactive substance that involves generation of heat, a refilling system for loading into and unloading a metallic closed container or a so-called canister, stored with the radioactive substance, from the storage container, and a refilling method.

2. Description of the Related Art

Highly radioactive substances, represented by used fuels from nuclear reactors, are reprocessed to recover useful substances that can be reused as fuels such as plutonium. These used fuels are hermetically sealed as they are stored for reprocessing. A dry method using a storage container such as a cask is regarded as a noticeable storage method for these highly radioactive substances. There are casks of various constructions that are used for the dry method. A concrete cask, a concrete structure that shields a used fuel, attracts special attention owing to its low cost. Concrete has the advantage of necessary strength for a structure and the like.

The concrete cask of this type is provided with a tubular concrete container that is closed at the top and bottom portions, and a metallic closed container or a so-called canister, in the form of a tube having a used fuel sealed therein, is stored in the concrete container.

In general, a canister is heated to a high temperature of about 200° C. by decay heat from a used fuel. Therefore, the concrete cask is provided with a heat removing structure for removing the decay heat from the used fuel. More specifically, an annular gap that serves as a cooling air passage is defined between the inner peripheral surface of the concrete container and the outer peripheral surface of the canister. The peripheral edge portion of the lower end of the concrete container is provided with intake vents, and the peripheral edge portion of the upper end of the container with exhaust vents. As the open air as cooling air that is introduced into the concrete container through the intake vents is run in the cooling air passage for natural convection and discharged through the exhaust vents, the canister and the concrete cask are relieved of heat and cooled.

In the concrete cask constructed in this manner, the aforethe heat removing structure, concrete layer, and canister ensure the cooling of the used fuel, shielding of radiation, and hermetic sealing of the used fuel, respectively. The concrete cask must keep a highly radioactive substance safely and steadily for a long time, and is expected to have prolonged high radiation shielding performance.

On the other hand, the following processes are carried out to load the radioactive substance into and unload it from the concrete cask of this type.

First a used fuel from a nuclear reactor, as the radioactive substance, is stored and hermetically sealed in a canister in a storage pool of a nuclear power plant or the like, for example. After the canister is loaded into a transportation container or a so-called transportation cask, it is transported in a truck or the like to a storage facility. In this storage facility, the transported canister is drawn out of the transportation cask and loaded into a prepared concrete cask. The canister is stored and stocked in the concrete cask for a given time.

After it is thus stocked for the given time, the canister is unloaded from the concrete cask, loaded again into the transportation cask, and transported in a truck or the like to a reprocessing facility.

Normally, the concrete cask is set upright when the canister is loaded into and unloaded from the concrete cask or during canister refilling operations. The canister is suspended from above as it is loaded into the concrete cask or unloaded from the concrete cask through a top opening of the concrete cask.

In the canister refilling operation described above, however, the suspended canister must be supposed to fall from some cause, in some cases. If the canister situated right over the concrete cask or partially inserted in the canister falls during the refilling operation, for example, the canister may be supposed to run against the bottom wall of the concrete cask through the interior of the concrete cask and be broken by the resulting impact.

In order to secure the sealing and shielding properties of the canister and the concrete cask against radiation and further improve the reliability and safety, therefore, a countermeasure is needed to prevent breakage of the canister attributable to the aforethe falling.

BRIEF SUMMARY OF THE INVENTION

This invention has been made in consideration of these circumstances, and its object is to provide a storage container, a storage container refilling system, and a refilling method, in which breakage of a closed container can be prevented if the closed container falls during refilling operation for the closed container or the like.

In order to achieve the above object, a storage container according to an aspect of this invention comprises: a container body having a storage portion for storing a closed container, having a radioactive substance sealed therein, and a top opening through which the closed container is loaded into and unloaded from the storage portion; a lid closing the top opening of the container body; a heat removing portion having intake vents in a bottom portion of the container body, exhaust vents in a top portion of the container body, and a cooling air passage defined between an inner surface of the storage portion and an outer surface of the closed container stored in the storage portion, the heat removing portion being configured to cause air introduced into the container body through the intake vents to flow into the cooling air passage so as to remove heat from the radioactive substance and discharge the air through the exhaust vents; closing members configured to close the intake vents and exhaust vents as the closed container is loaded into and unloaded from the storage portion; and a speed reducing portion provided at the top opening of the container body and having a through hole through which the closed container can be passed, the through hole having a dimension smaller than the dimension of the storage portion and larger than the outside dimension of the closed container.

In loading into or unloading the closed container from the storage portion, according to the storage container with this construction, the closed container is loaded or unloaded through the through hole of the speed reducing portion. Since the this through hole has the dimension smaller than the dimension of the storage portion and larger than the outside dimension of the closed container, the gap between the outer surface of the closed container and the through hole that is formed as the closed container passes through the through hole can be made narrower than the gap between the closed container and the inner surface of the storage portion with the closed container set in the storage portion. By closing the intake vents and exhaust vents by means of the closing members, at the same time, air in the storage portion can be discharged to the outside only through the narrow gap between the outer surface of the closed container and the through hole.

If the closed container falls during refilling operations for the closed container, therefore, air that passes through the gap between the outer surface of the closed container and the through hole has high resistance and acts as an air damper, so that the falling speed of the closed container can be reduced considerably. Thus, if the closed container falls owing to any accident or the like, impact that acts on the closed container can be lowered to prevent breakage of the closed container.

Further, a storage container refilling system according to an aspect of this invention is a storage container refilling system for loading into and unloading a closed container having a radioactive substance sealed therein from a storage container, which comprises a container body having a storage portion for storing the closed container and a top opening through which the closed container is loaded into and unloaded from the storage portion, a lid closing the top opening of the container body, and a heat removing portion having intake vents in a bottom portion of the container body, exhaust vents in the top portion of the container body, and a cooling air passage defined between an inner surface of the storage portion and an outer surface of the closed container stored in the storage portion, the heat removing portion being configured to cause air introduced into the container body through the intake vents to flow into the cooling air passage so as to remove heat from the radioactive substance, and discharge the air through the exhaust vents, the storage container refilling system comprising:

a reduction cylinder having an outside dimension smaller than the dimension of the storage portion and an inside dimension larger than the dimension of the closed container and capable of being loaded into the storage portion through the top opening; a first lift mechanism configured to raise and lower the reduction cylinder between a down position in which the reduction cylinder is set in the storage portion of the container body and an up position such that the reduction cylinder is drawn out of the storage portion; and a second lift mechanism having a holding portion configured to hold one end portion of the closed container and to raise and lower the closed container with respect to the container body, the second lift mechanism being configured to load into and unload the closed container from the storage portion of the container body with the reduction cylinder set in the storage portion.

Furthermore, a storage container refilling method according to an aspect of this invention is a storage container refilling method for loading into and unloading a closed container having a radioactive substance sealed therein from a storage container, which comprises a container body having a storage portion for storing the closed container and a top opening through which the closed container is loaded into and unloaded from the storage portion, a lid closing the top opening of the container body, and a heat removing portion having intake vents in the bottom portion of the container body, exhaust vents in the top portion of the container body, and a cooling air passage defined between the inner surface of the storage portion and the outer surface of the closed container stored in the storage portion, the heat removing portion being configured to cause air introduced into the container body through the intake vents to flow into the cooling air passage so as to remove heat from the radioactive substance, and discharge the air through the exhaust vents, the storage container refilling method comprising: loading a reduction cylinder, having an outside dimension smaller than the dimension of the storage portion and an inside dimension larger than the dimension of the closed container, into the storage portion through the top opening of the storage container; inserting the closed container into the reduction cylinder from above through the top opening of the reduction cylinder, thereby locating the closed container in the storage portion; then pulling up the reduction cylinder from the storage portion; and unloading the closed container from the storage portion in a manner such that the closed container is pulled up from the storage portion after the reduction cylinder is loaded into the storage portion through the top opening of the storage container and located outside the closed container.

According to the refilling system and the refilling method arranged in this manner, the reduction cylinder is previously set in the storage portion of the storage container before the closed container is loaded into and unloaded from the storage portion. When the reduction cylinder is set in the storage portion, a space having a dimension smaller than that of the storage portion is defined in the storage portion by the reduction cylinder. Thus, the gap between the outer surface of the closed container that passes through the reduction cylinder and the inner surface of the reduction cylinder is narrower than the gap between the closed container set in the storage portion and the inner surface of the storage portion. Air in the reduction cylinder is discharged to the outside through this narrow gap only. If the closed container falls during the refilling operation for the closed container, therefore, the air that passes through the gap between the inner surface of the reduction cylinder and the outer surface of the closed container has high resistance and acts as an air damper, so that the falling speed of the closed container can be reduced considerably. Thus, if the closed container falls owing to any accident or the like, the impact that acts on the closed container can be lowered to prevent breakage of the closed container.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A concrete cask according to a first embodiment of this invention will now be described in detail with reference to the drawings.

Figure 1:
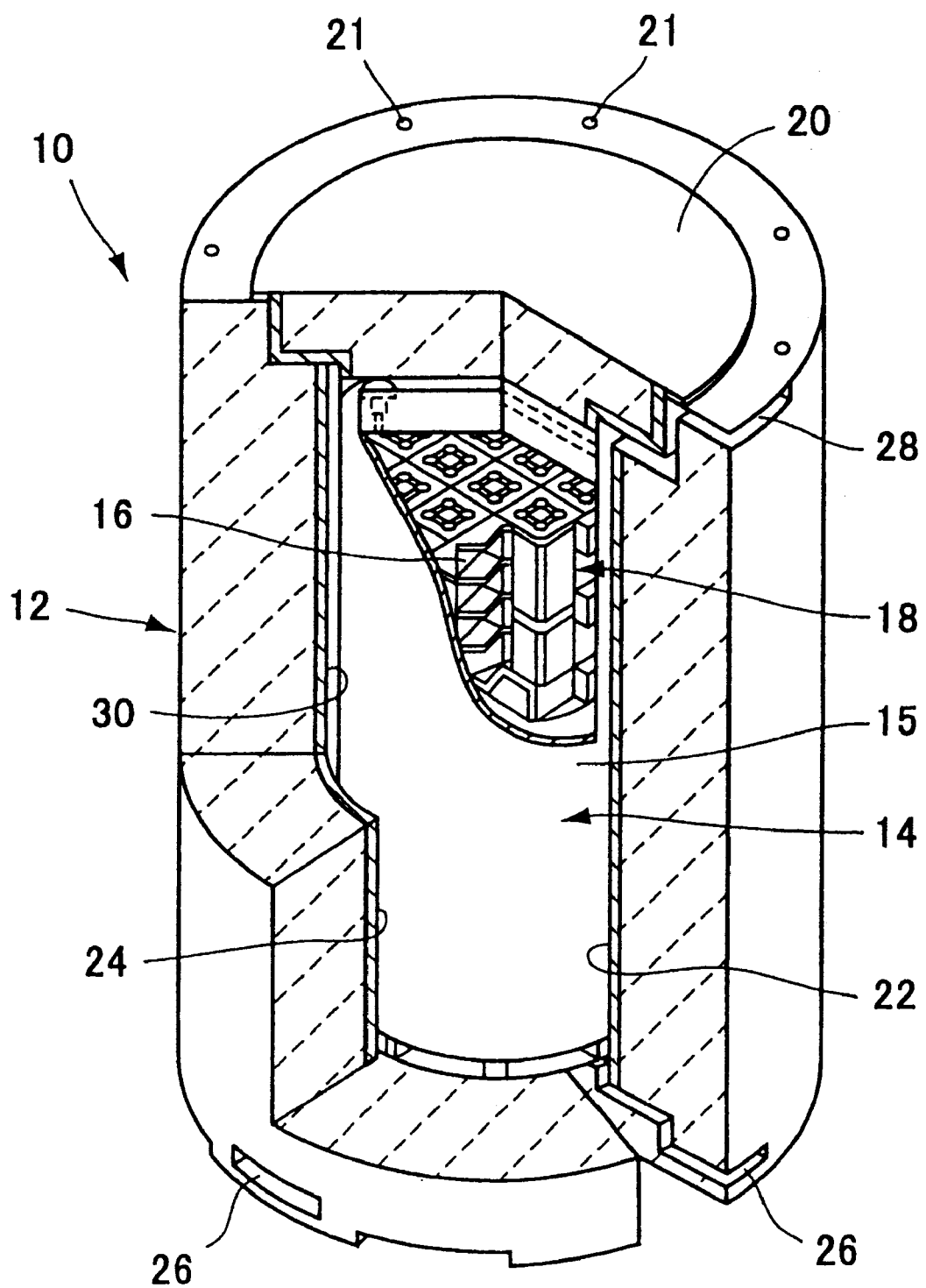
FIG. 1 is a cutaway perspective view showing a concrete cask according to a first embodiment of this invention.
Figure 2:
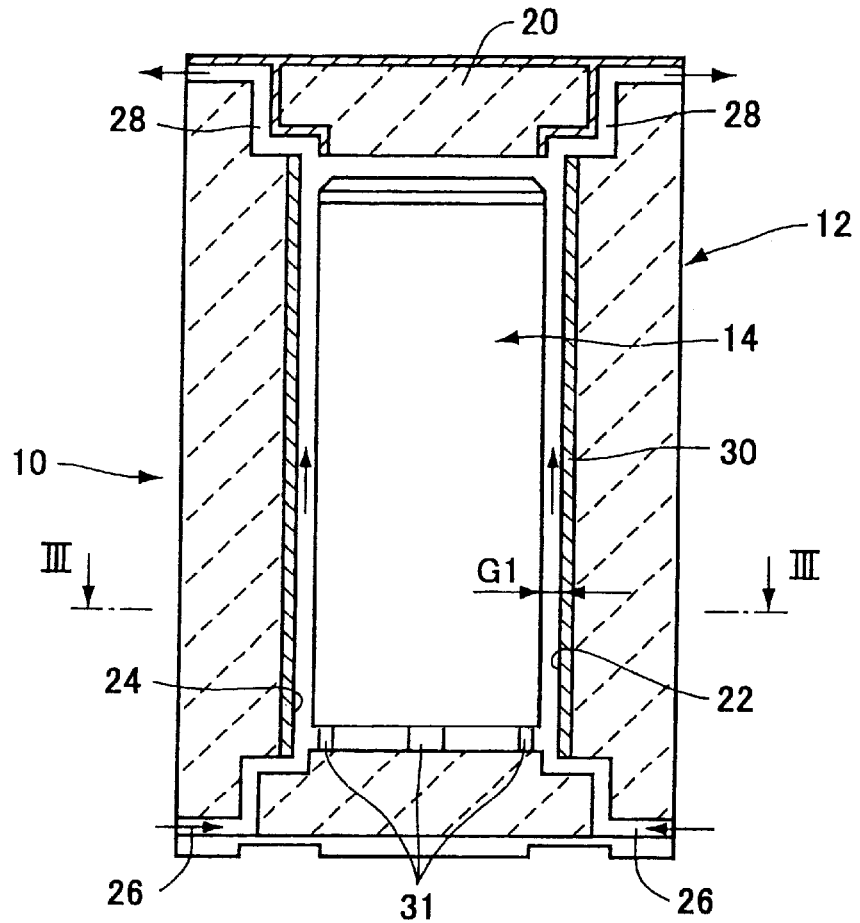
FIG. 2 is a longitudinal sectional view of the concrete cask.
Figure 3:
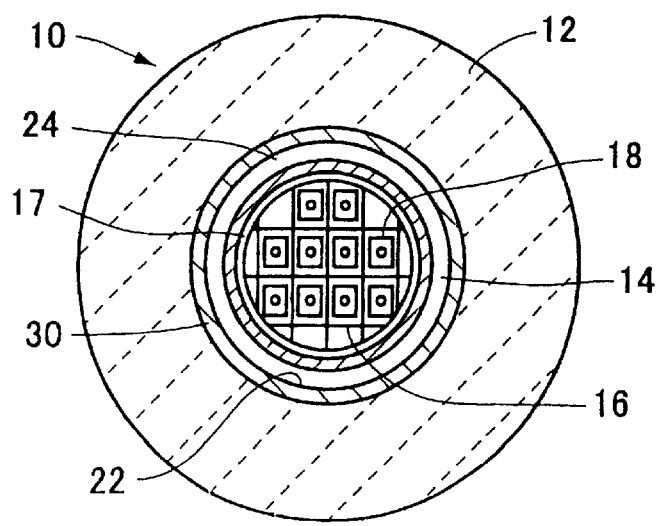
FIG. 3 is a sectional view taken along line III—III of FIG. 2.

As shown in FIGS. 1 to 3, a concrete cask 10 for use as a concrete storage container comprises a container body 12 that is formed of concrete and functions as a shielding structure, and a canister 14 is stored in this container body.

The canister 14 is formed of a cylindrical closed container made of metal and closed at both ends. A plurality of used fuel aggregates 18 are sealed in the closed container in a manner such that they are supported by means of a basket 16. The used fuel aggregates 18 are formed of a used fuel from a reactor, for example, and contain a radioactive substance that involves heat release attributable to decay heat and generation of radiation.

The container body 12 of the concrete cask 10 has the shape of a closed-bottomed cylinder with a height of about 6 m and a diameter of about 4 m, for example, and the concrete wall thickness is about 0.9 m. A top opening of the container body 12 is closed by means of a concrete lid 20 of which the outer surface is covered by a carbon steel plate. The lid 20 is fixed to the top end of the container body 12 by means of a plurality of bolts 21. Bars (not shown) are arranged in the concrete wall of the container body 12.

A columnar storage portion 22 is defined in the container body 12 by the inner peripheral surface of the container body and the lid 20. The canister 14 is stored in the storage portion 22. The canister 14 is placed on a plurality of ribs 31 that are formed on the bottom of the storage portion 22, and is located coaxially with the container body 12. Further, the canister 14 is stored in the storage portion 22 in a manner such that a fixed gap, e.g., a gap G1 of about 10 cm, is defined between its outer peripheral surface and the inner peripheral surface of the container body 12.

The aforethe gap between the outer peripheral surface of the canister 14 and the inner peripheral surface of the container body 12 forms a cooling air passage 24 through which cooling air flows. This cooling air passage 24 is formed covering the whole circumference of the outer peripheral surface of the canister 14 and the overall axial length of the outer peripheral surface.

A plurality of intake vents 26, e.g., four in number, are formed in the bottom portion of the container body 12. Likewise, four exhaust vents 28 are formed in the top portion of the container body 12, and individually communicate with the cooling air passage 24. The four intake vents 26 are arranged at equal spaces in the circumferential direction of the container body 12, and open in the outer peripheral surface of the bottom portion of the container body 12. Further, the exhaust vents 28 are arranged at equal spaces in the circumferential direction of the container body 12, and open in the outer peripheral surface of the top portion of the container body 12.

The intake vents 26, exhaust vents 28, and cooling air passage 24 constitute a heat removing portion that removes heat from the concrete cask 10 by natural circulating-air cooling. More specifically, the open air as the cooling air that is introduced into the container body 12 through the intake vents 26 passes through the cooling air passage 24 and flows around the canister 14. While doing this, it removes heat from the canister 14 and the container body 12, thereby cooling them. The cooling air heated to higher temperature by means of heat from the canister 14 is discharged to the outside of the container body 12 through the exhaust vents 28.

On the other hand, a cylindrical liner 30 of metal such as carbon steel is provided on the inner peripheral surface of the container body 12. The metallic liner 30, which is higher in heat transfer efficiency than cooling air, serves to accelerate the transfer of heat generated from the used fuel aggregates 18 and intercept radiation, mostly gamma rays, from the used fuel aggregates 18.

Further, the concrete cask 10 according to the first embodiment comprises a speed reducing portion, which is used in loading into and unloading the canister 14 from the storage portion 22 of the container body 12, that is, in refilling, and a closing member for closing the intake vents 26 and the exhaust vents 28 of the container body 12.

Figure 4:
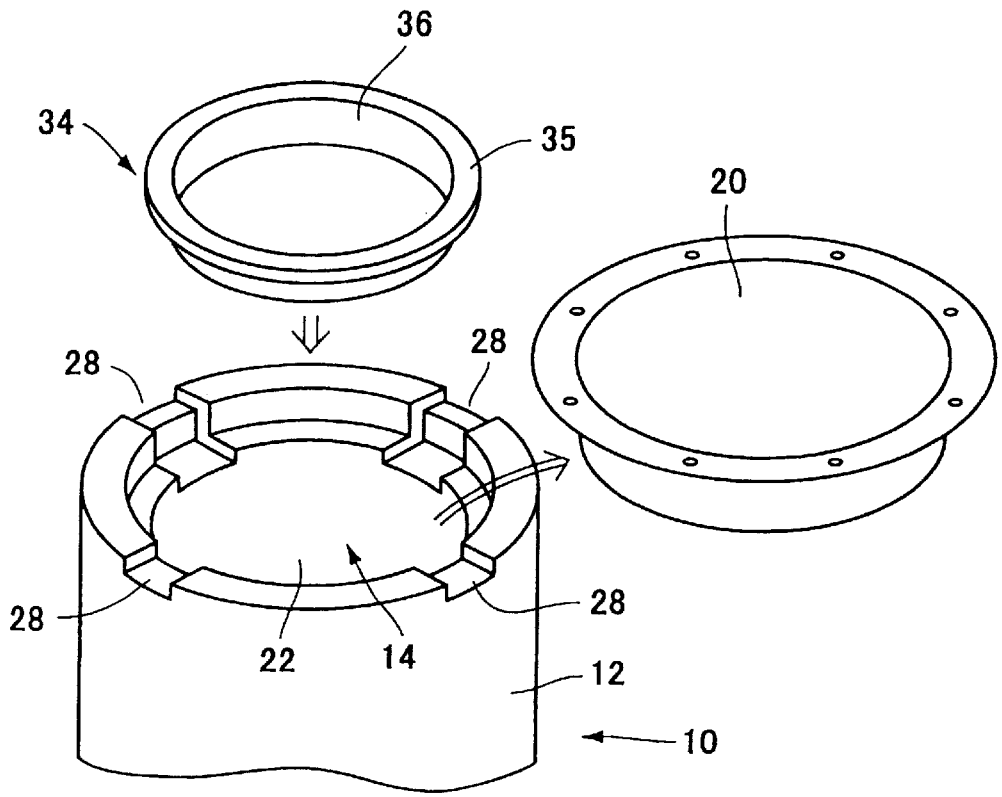
FIG. 4 is an exploded perspective view showing the upper part of a container body of the concrete cask, a lid, and a speed reducing member.
Figure 5:
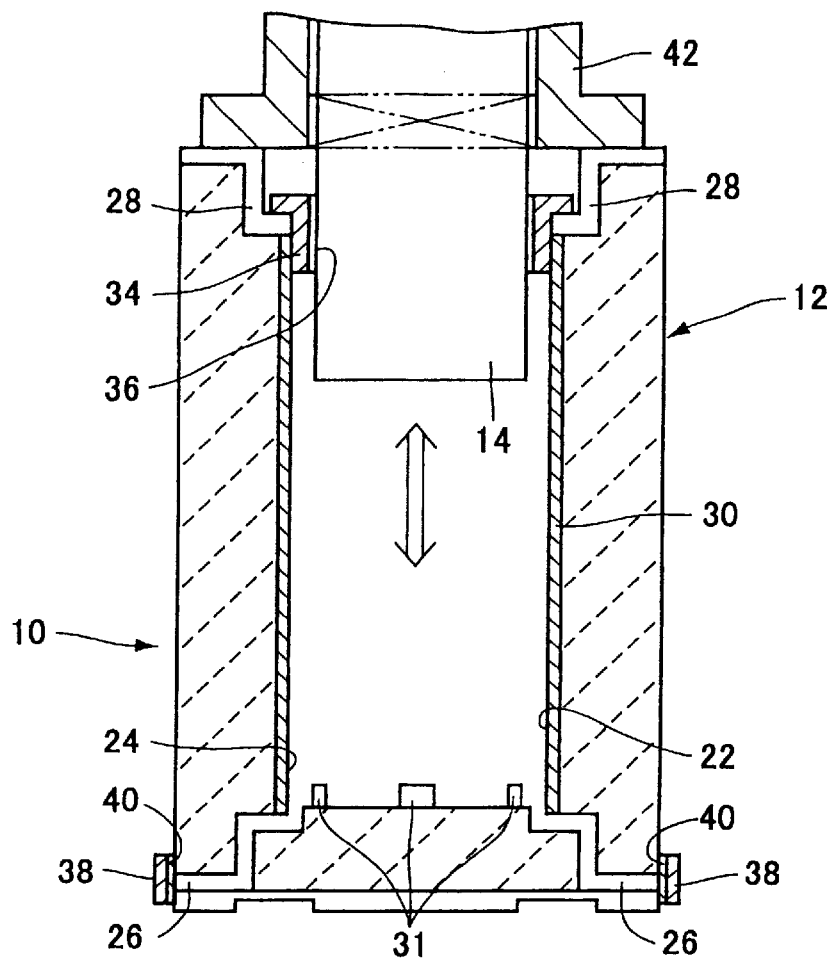
FIG. 5 is a sectional view showing the way a canister is loaded into and unloaded from a storage portion of the concrete cask.
Figure 6:
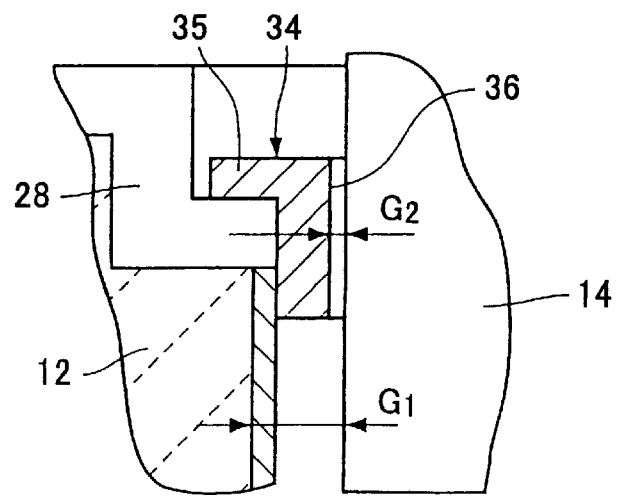
FIG. 6 is a partially enlarged sectional view of the top portion of the container body loaded with the speed reducing member.

More specifically, as shown in FIGS. 4 to 6, the speed reducing portion is provided with a speed reducing member 34 that is substantially ring-shaped and is removably attached to the top opening of the container body 12. The speed reducing member 34 has a flange 35 that is situated around its top portion, and is integrally formed of metal such as carbon steel, stainless steel, etc. The bore of the speed reducing member 34 functions as a through hole 36 through which the canister 14 can be passed. The diameter of this through hole is smaller than the diameter of the storage portion 22 and larger than the outside diameter of the canister 14. Further, the outside diameter of the speed reducing member 34 is substantially equal to the diameter of the storage portion 22, and the diameter of the flange 35 is larger enough than the diameter of the storage portion 22.

In refilling the canister 14, the lid 20 is removed from the container body 12 of the concrete cask 10 to open its top, and instead, the speed reducing member 34 is attached to the top opening of the container body 12. In this case, the speed reducing member 34 is fitted in the top opening of the container body 12 in a manner such that its outer peripheral surface is intimately in contact with the inner surface of the top portion of the storage portion 22 of the container body 12 and that the flange 35 rests on the top portion of the container body 12, and is kept coaxial with the container body. At the same time, the speed reducing member 34 closes the four exhaust vents 28 and functions as a part of the closing member of this invention.

Figure 7:
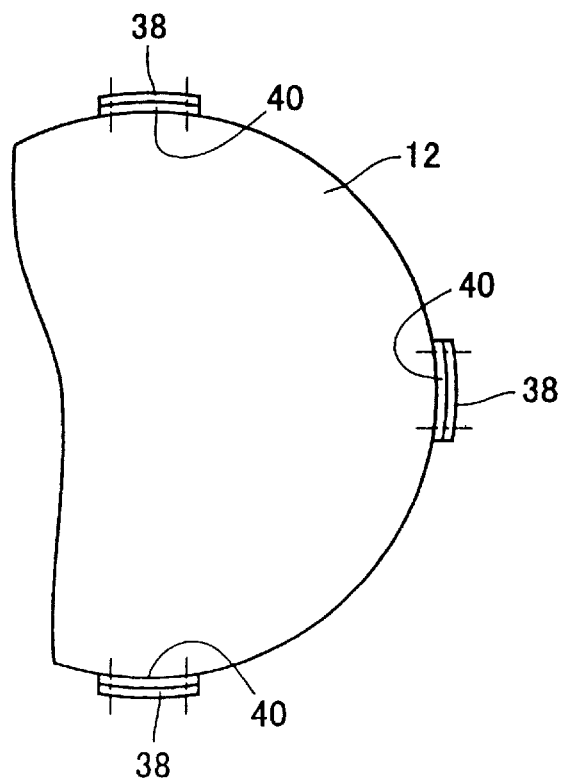
FIG. 7 is a view schematically showing closing plates attached individually to intake vents of the concrete cask.

As shown in FIGS. 5 and 7, on the other hand, the closing member includes a plurality of closing plates 38 that are formed of metal such as carbon steel, stainless steel, etc. In refilling the canister 14, each closing plate 38 is fixed to the outer surface of the container body 12 by means of bolts with an 0-ring 40 between them, and closes each intake vent 26.

After the speed reducing member 34 is thus attached with the intake vents 26 closed by means of the closing plates 38, an outer casing 42 of a refilling apparatus that holds the canister 14 is located over the container body 12, as shown in FIGS. 5 and 6. Then, the canister 14 is loaded from the outer casing 42 into the storage portion 22 of the container body 12 through the through hole 36 of the speed reducing member 34. In unloading the canister 14 from the storage portion 22, in contrast with this, the canister 14 is pulled up through the through hole 36 of the speed reducing member 34 and put into the outer casing 42.

Thus, the canister 14 is loaded and unloaded through the through hole 36 of the speed reducing member 34. The through hole 36 has a diameter smaller than the diameter of the storage portion 22 and larger than the outside diameter of the canister 14. Therefore, a gap G2 that is defined between the outer surface of the canister 14 and the through hole 36 as the canister passes through the through hole is much narrower than the gap G1 between the canister 14 set in the storage portion 22 and the inner surface of the storage portion. For example, the gap G2 is adjusted to about 10 to 40 mm, and preferably, to about 10 to 20 mm. During the loading and unloading operations, at the same time, the intake vents 26 are closed by means of the closing plates 38, individually, and the exhaust vents 28 by means of the speed reducing member 34.

If the canister 14 falls from any cause while the canister is being refilled, air and other gases that are confined to the storage portion 22 are discharged to the outside only through the narrow gap G2 between the outer surface of the canister 14 and the through hole 36. As this is done, the air and other gases, having high flow resistance, act as an air damper for the canister 14. Thus, the falling speed of the canister 14 can be reduced considerably.

Figure 8:
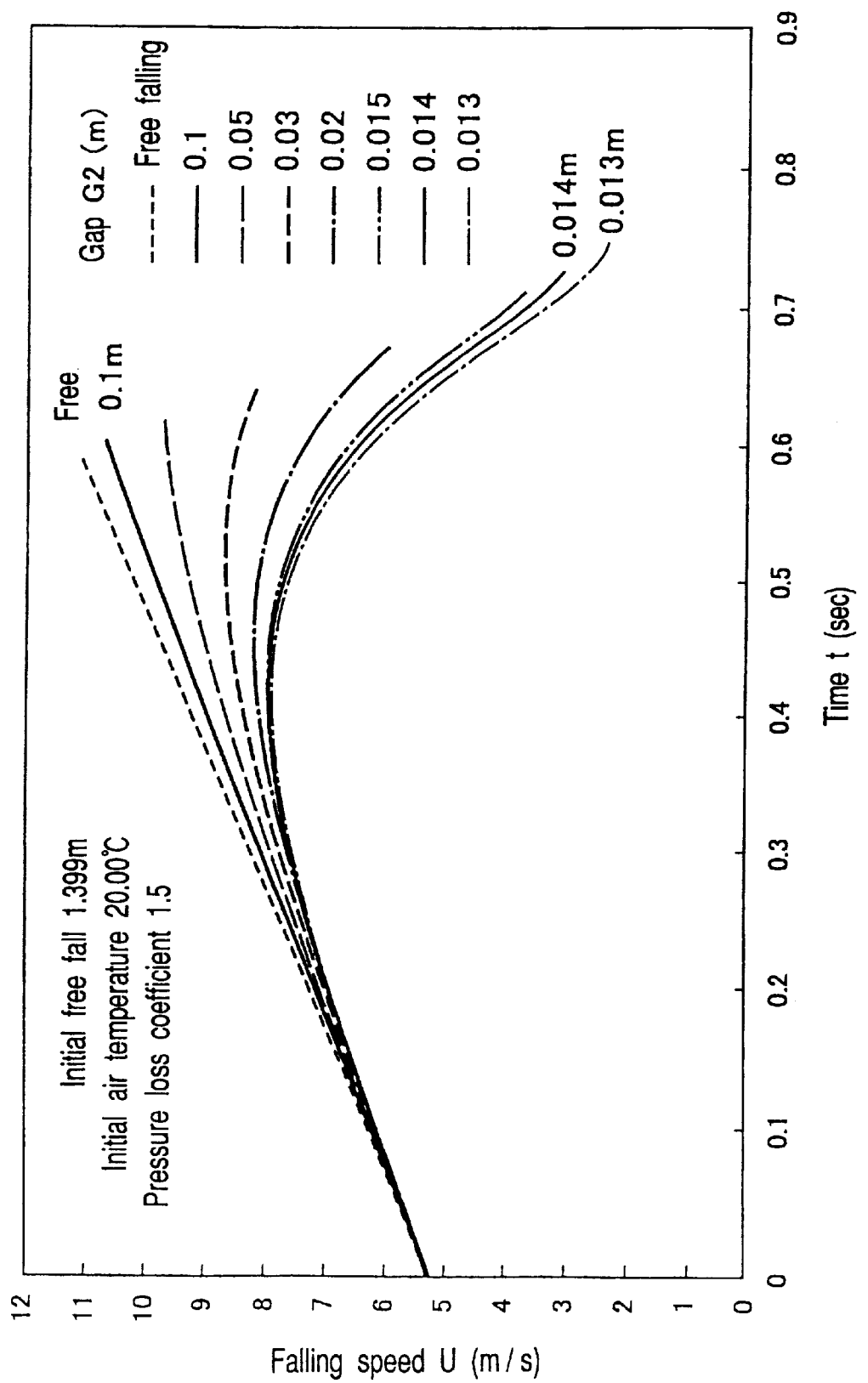
FIG. 8 is a graph showing the relation between the falling time and falling speed of the canister.

FIG. 8 shows the way the falling speed of the canister changes with time when the gap G2 is changed variously, and indicates that the narrower the gap G2, the more the falling speed can be reduced.

Thus, if the canister 14 falls owing to any accident or the like during the refilling operation, impact that acts on the canister can be lowered to prevent breakage of the canister.

Figure 9:
FIG. 9 is a sectional view showing a modification of the speed reducing member.

In the first embodiment described above, the inner surface of the through hole 36 formed in the speed reducing member 34 is a smooth surface. As shown in FIG. 9, however, a plurality of annular grooves 44 that are substantially coaxial with the through hole 36 may be formed in the inner surface of the through hole so as to be spaced in the axial direction of the speed reducing member. If this speed reducing member 34 is used, the coefficient of pressure loss of air that flows through the gap between the outer surface of the canister 14 and the through hole 36 increases, so that a greater damping effect can be obtained.

Figure 10:
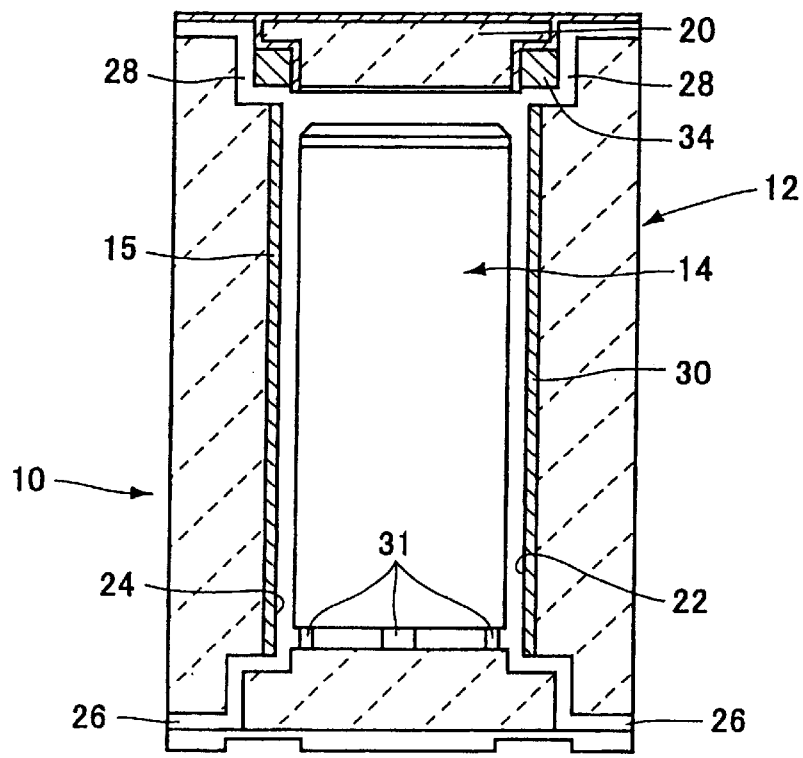
FIG. 10 is a sectional view showing a modification in which the speed reducing member is fixed to the container body.

Further, the speed reducing member 34 is configured to be removable from the container body 12. As shown in FIG. 10, however, it may be fixedly provided in the top opening of the container body 12. In this case, the speed reducing member 34 is formed of metal or concrete. If concrete is used, it may be formed integrally with the container body 12. During the canister refilling operation, in this case, moreover, the exhaust vents 28 are closed individually by means of closing members that resemble the aforethe closing plates 38.

Figure 11:
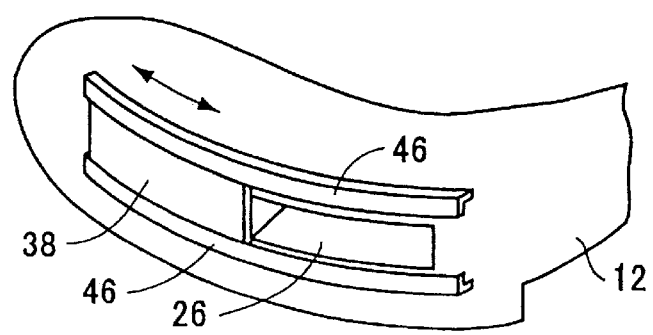
FIG. 11 is a perspective view showing a modification of a mounting structure for the closing plate.

Furthermore, the closing plates 38 that close the intake vents 26 and the exhaust vents 28 may be removably attached by other methods, such as chucking, than bolting. Moreover, the closing plates 38 are not limited to the removable type, and may be attached to the container body 12 for movement between a position where they close the intake vents or the exhaust vents and a position where they allow the intake vents or the exhaust vents to open. In this case, a pair of guide rails 46 may be provided on the outer surface of the container body 12 in the vicinity of each intake vent 26 or exhaust vent 28 so that each closing plate 38 can slide along the guide rails 46, as shown in FIG. 11, for example.

The following is a description of a storage container refilling system according to a second embodiment of this invention.

Figure 12:
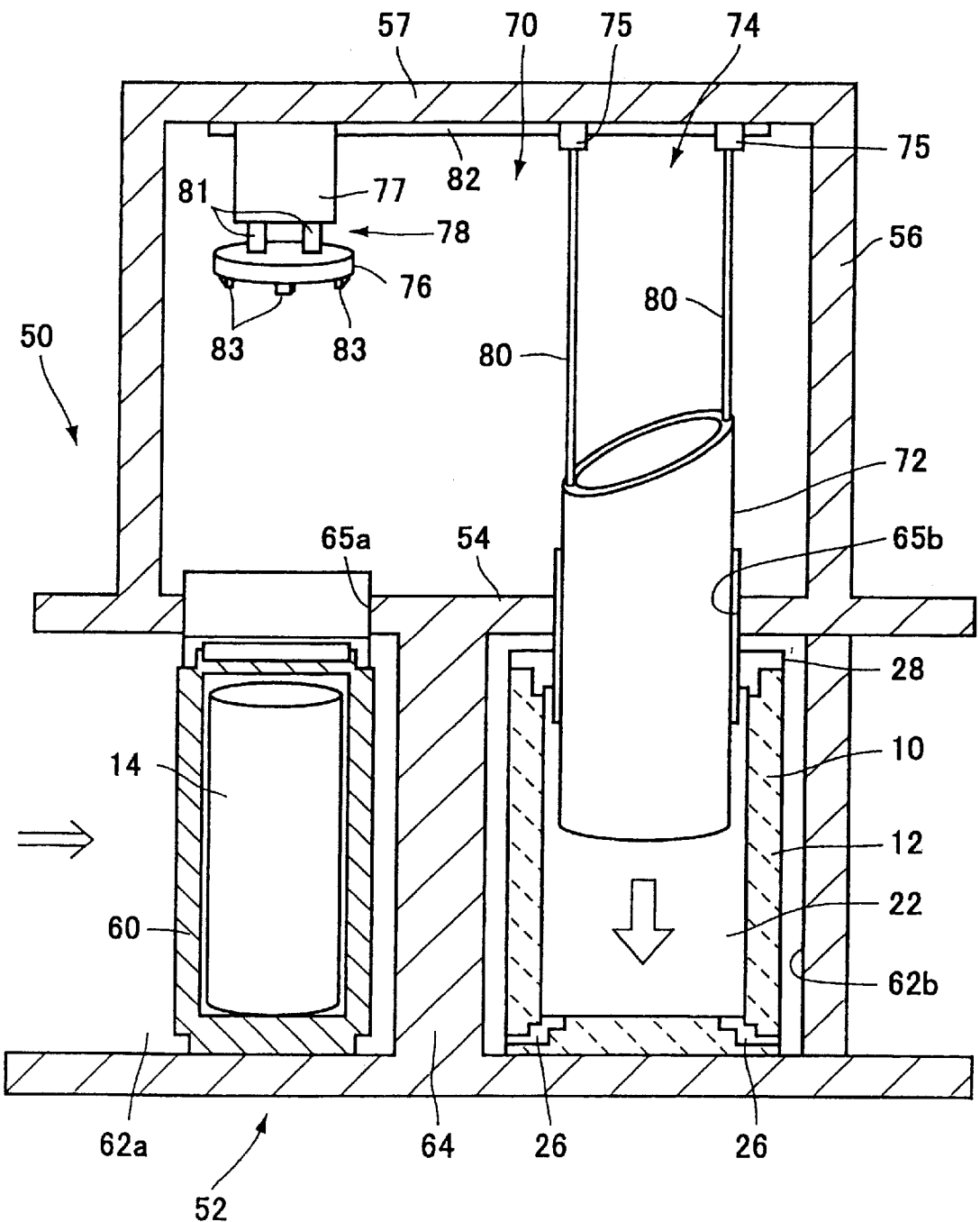
FIG. 12 is a sectional view showing a storage container refilling system according to a second embodiment of this invention.

As shown in FIG. 12, the refilling system comprises a building 50 that is formed of concrete walls, for example. The building 50 is provided with a container stage portion 52 and a housing 56 located over the container stage portion. The container stage portion 52 and the housing 56 are divided by means of a horizontal floor wall 54.

The container stage portion 52 has a first stage portion 62a, in which a transportation container or a transportation cask 60 for storing and transporting a canister 14 is placed upright, and a second stage portion 62b, in which a concrete cask 10 is placed upright. The first and second stage portions 62a and 62b are situated side by side, and are divided from each other by means of a vertical partition wall 64. Further, the first stage portion 62a and the second stage portion 62b open into the housing 56 through a first opening 65a and a second opening 65b that are formed in a floor wall 54, respectively. The concrete cask 10 is supposed to have the same configuration as the concrete cask according to the foregoing first embodiment shown in FIGS. 1 to 3.

The housing 56 contains therein a refilling apparatus 70 for refilling the concrete cask 10 with the canister 14. The refilling apparatus 70 comprises a reduction cylinder 72 capable of being loaded into a storage portion 22 of the concrete cask 10, a first lift mechanism 74 for raising and lowering the reduction cylinder 72 with respect to the concrete cask 10, and a second lift mechanism 78, which includes a holding portion 76 for holding the upper end of the canister 14 and holds the canister as it raises and lowers the canister.

The reduction cylinder 72 is formed of a metal such as carbon steel or stainless steel, and has an outside diameter smaller than the diameter of the storage portion 22 formed in a container body 12 of the concrete cask 10 and an inside diameter larger than the diameter of the canister 14. Accordingly, the reduction cylinder 72 can be inserted into the storage portion 22 of the concrete cask 10 through the second opening 65b of the floor wall 54 and a top opening of the container body 12. At the same time, the canister 14 can be passed through the reduction cylinder 72. The inside diameter of the reduction cylinder 72 is set so that the gap between the outer surface of the canister and the inner surface of the reduction cylinder ranges from about 10 to 40 mm, and preferably from about 10 to 20 mm, with the canister 14 inserted therein. Further, the reduction cylinder 72 is formed so that it is longer than the axial length of the storage portion 22 and that its upper end portion slightly projects from the container body 12 when it is set in the storage portion 22, as mentioned later.

The first lift mechanism 74 includes a drive portion 75 attached to a top wall 57 of the housing 56 and situated over the first opening 65b. This drive portion pendently supports the reduction cylinder 72 by means of a plurality of wires 80. The first lift mechanism 74 can wind up and pay out the wires 80 by means of the drive portion 75, thereby raising and lowering the reduction cylinder 72, so that the reduction cylinder can be loaded into or unloaded from the storage portion 22 of the concrete cask 10.

On the other hand, the holding portion 76 of the second lift mechanism 78 has a plurality of engaging claws 83. The canister 14 is held in a manner such that the engaging claws are caused individually to engage a plurality of engaging recesses (not shown) that are formed in the top wall of the canister 14. Further, the second lift mechanism 78 includes a drive portion 77 that is attached to the top wall 57 of the housing 56. This drive portion pendently supports the holding portion 76 by means of a plurality of wires 81. Further, the drive portion 77 is movable along a guide rail 82 attached to the inner surface of the top wall 57, between a first position (illustrated) over the first opening 65a in the floor wall 54, that is, over the transportation cask 60 and a second position over the concrete cask 10.

The second lift mechanism 78 can wind up and pay out the wires 81 by means of the drive portion 77, thereby raising and lowering the canister 14 that is held by means of the holding portion 76, and is movable between the first position and the second position with the canister 14 held in place.

The following is a description of canister refilling operation by means of the refilling system described above.

First, the transportation cask 60 that is transported from a nuclear power plant or the like is placed upright in the first stage portion 62a, while the concrete cask 10 is placed upright in the second stage portion 62b. The transportation cask 60 is stored with the canister 14 in which a used fuel is sealed. As this is done, the reduction cylinder 72 is held in its up position in the housing 56, while the second lift mechanism 78 is moved to the first position in advance. Further, the concrete cask 10 is unlidded beforehand.

Figure 13A:
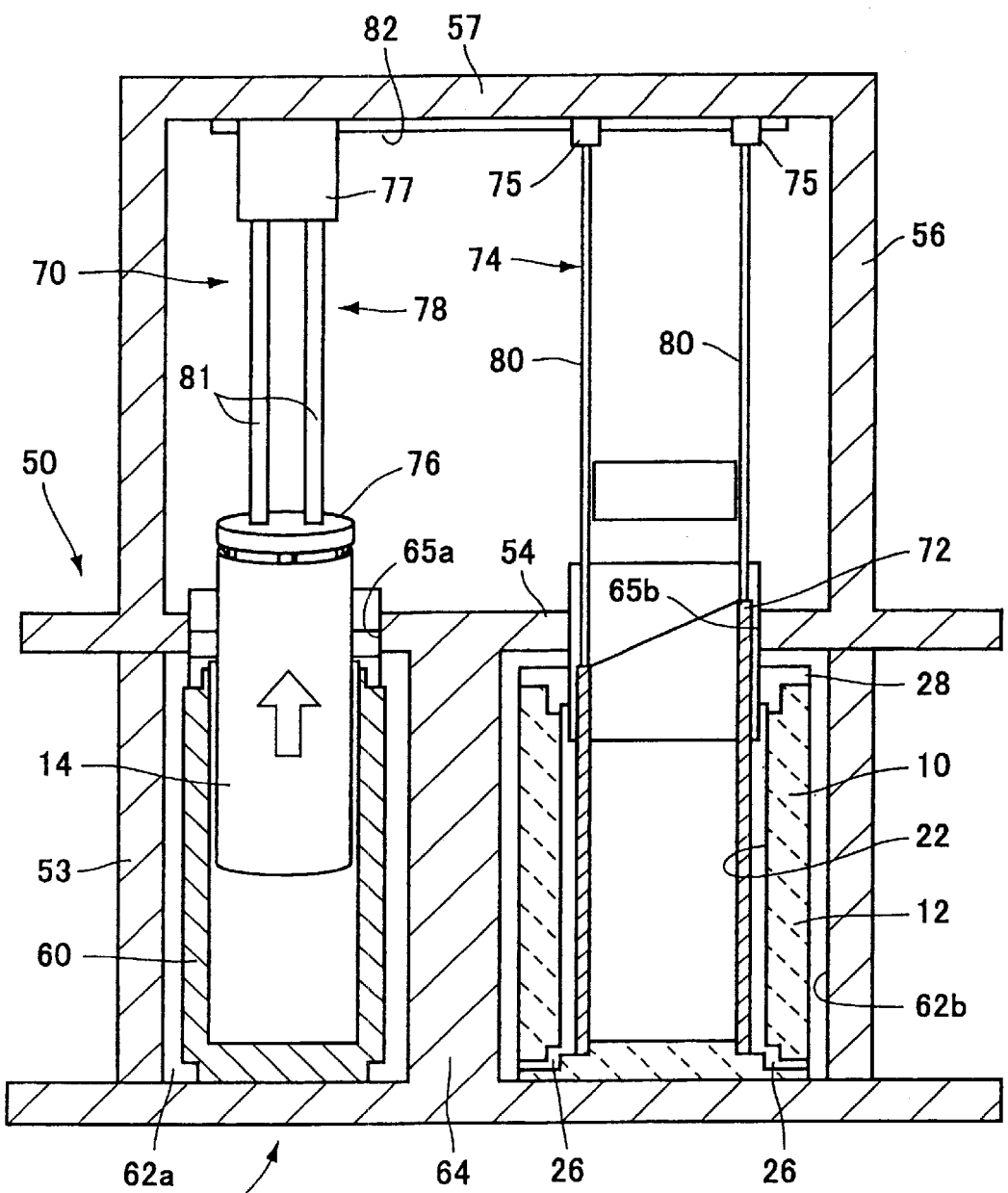
FIG. 13A is a sectional view showing a refilling process of the refilling system according to the second embodiment.

Subsequently, the flank of the first stage portion 62a is shielded with a movable wall 53, and the transportation cask 60 is unlidded, as shown in FIG. 13A. In this state, the drive portion 77 of the second lift mechanism 78 is driven to lower the holding portion 76 to the upper end of the canister 14, and the upper end portion of the canister 14 is held by means of this holding portion. Thereafter, the holding portion 76 is pulled up together with the canister 14, and the canister 14 is taken out of the transportation cask 60 and brought into the housing 56.

At the same time, the drive portion 75 of the first lift mechanism 74 is driven to lower the reduction cylinder 72 and insert it into the storage portion 22 through the second opening 65b of the floor wall 54 and the top opening of the container body 12. When the lower end of the reduction cylinder 72 abuts against the inner surface of the bottom wall of the container body 12, that is, when the reduction cylinder 72 is inserted into its down position (illustrated), the drive by means of the drive portion 75 is stopped.

Figure 13B:
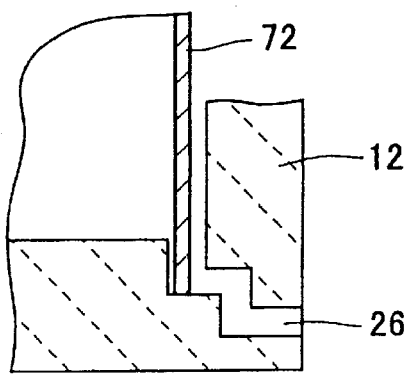
FIG. 13B is an enlarged sectional view showing a part of FIG. 13A.

In the down position, a bottom opening of the reduction cylinder 72 is closed by means of the bottom wall of the container body 12, as shown in FIG. 13B. Further, the upper end portion of the reduction cylinder 72 is situated above exhaust vents 28 of the container body 12, and slightly projects from the top opening of the container body. Thus, a space is defined by the reduction cylinder 72 and the bottom wall of the container body 12 in the storage portion 22. This space has a diameter smaller than that of the storage portion 22, and all its area except the top opening of the reduction cylinder 72 is screened from the outside.

Figure 14:
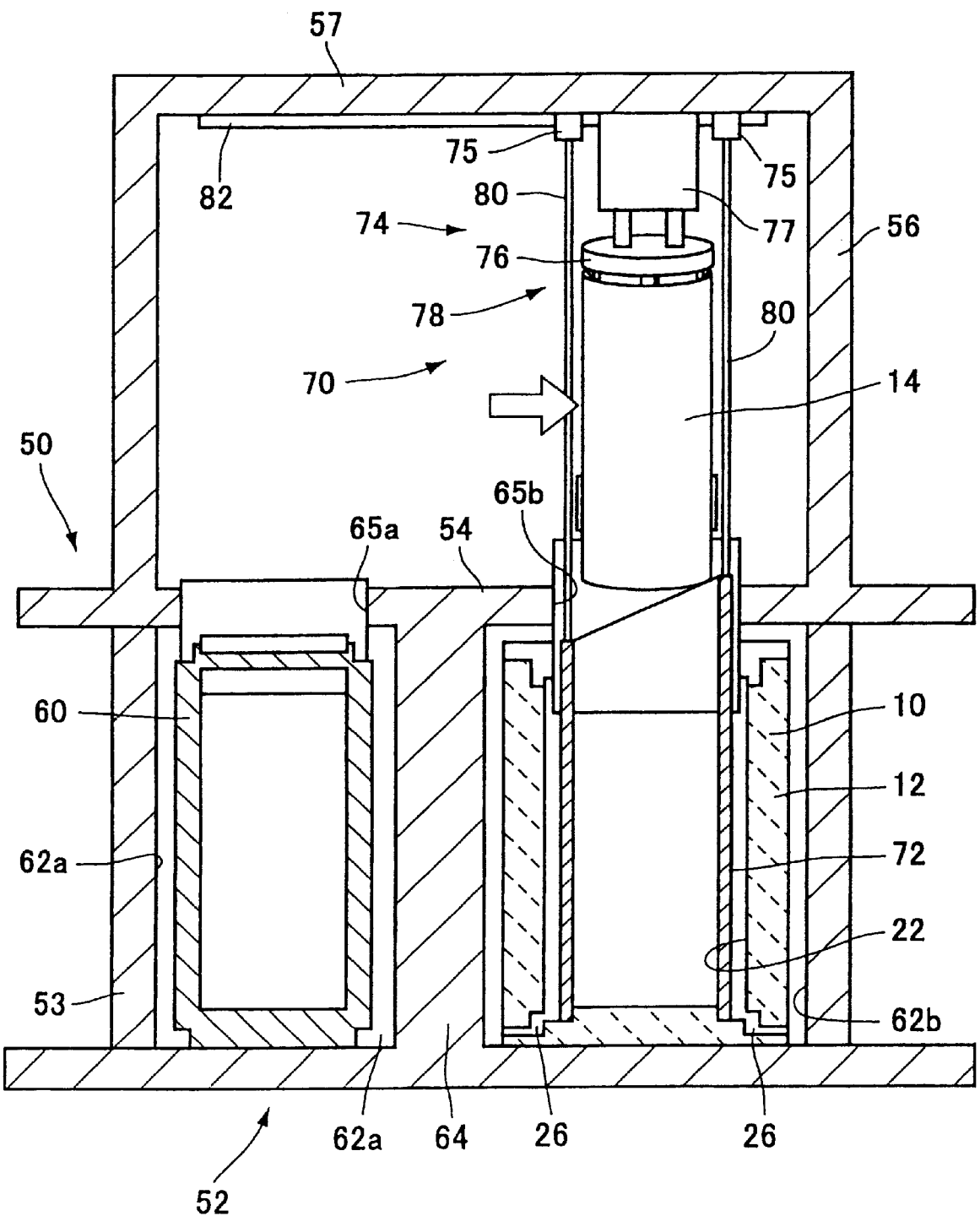
FIG. 14 is a sectional view showing a refilling process of the refilling system according to the second embodiment.

Then, the drive portion 77 of the second lift mechanism 78 is moved from the first position to the second position, and the canister 14 that is suspended by means of the second lift mechanism is carried into a position over the concrete cask 10, as shown in FIG. 14. After the canister 14 is taken out of the transportation cask 60, the transportation cask 60 is lidded.

Figure 15:
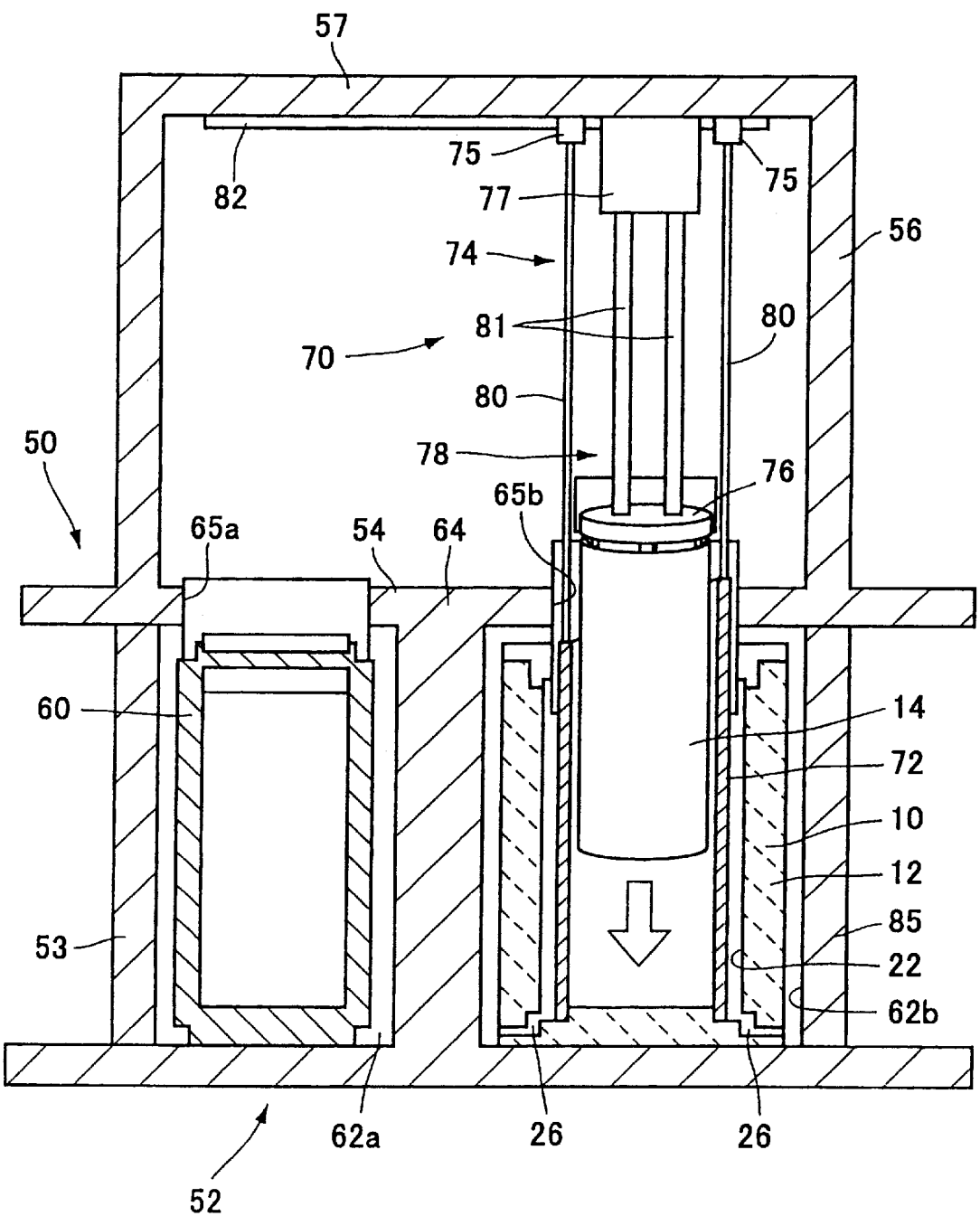
FIG. 15 is a sectional view showing a refilling process of the refilling system according to the second embodiment.

Subsequently, the drive portion 77 of the second lift mechanism 78 is driven to lower the holding portion 76 and the canister 14 and insert the canister 14 into the reduction cylinder 72 through the second opening 65b of the floor wall 54 and a top opening of the reduction cylinder, as shown in FIG. 15. When the lower end of the canister 14 abuts against the inner surface of the bottom wall of the container body 12, that is, when the canister 14 is stored entire in the storage portion 22 of the concrete cask 10, the drive by means of the drive portion 77 is stopped.

Figure 16:
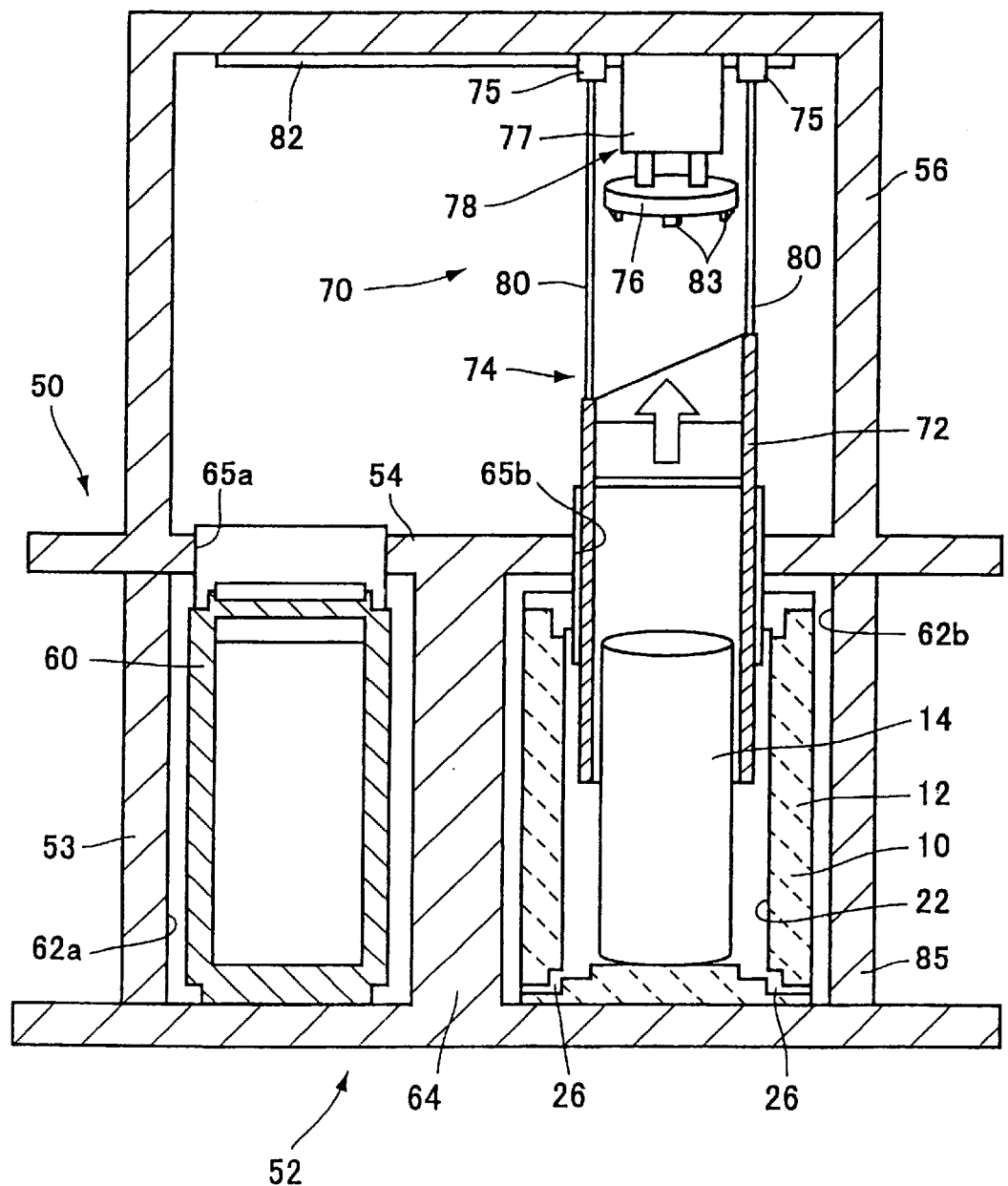
FIG. 16 is a sectional view showing a refilling process of the refilling system according to the second embodiment.

Thereafter, the second lift mechanism 78 releases the canister 14 from the hold by means of the holding portion 76, and pulls up the holding portion 76 into the housing 56 by means of the drive portion 75, as shown in FIG. 16. At the same time, the first lift mechanism 74 drives the drive portion 75 to pull up the reduction cylinder 72 from the storage portion 22 of the concrete cask 10 and bring it into the housing 56.

Figure 17:
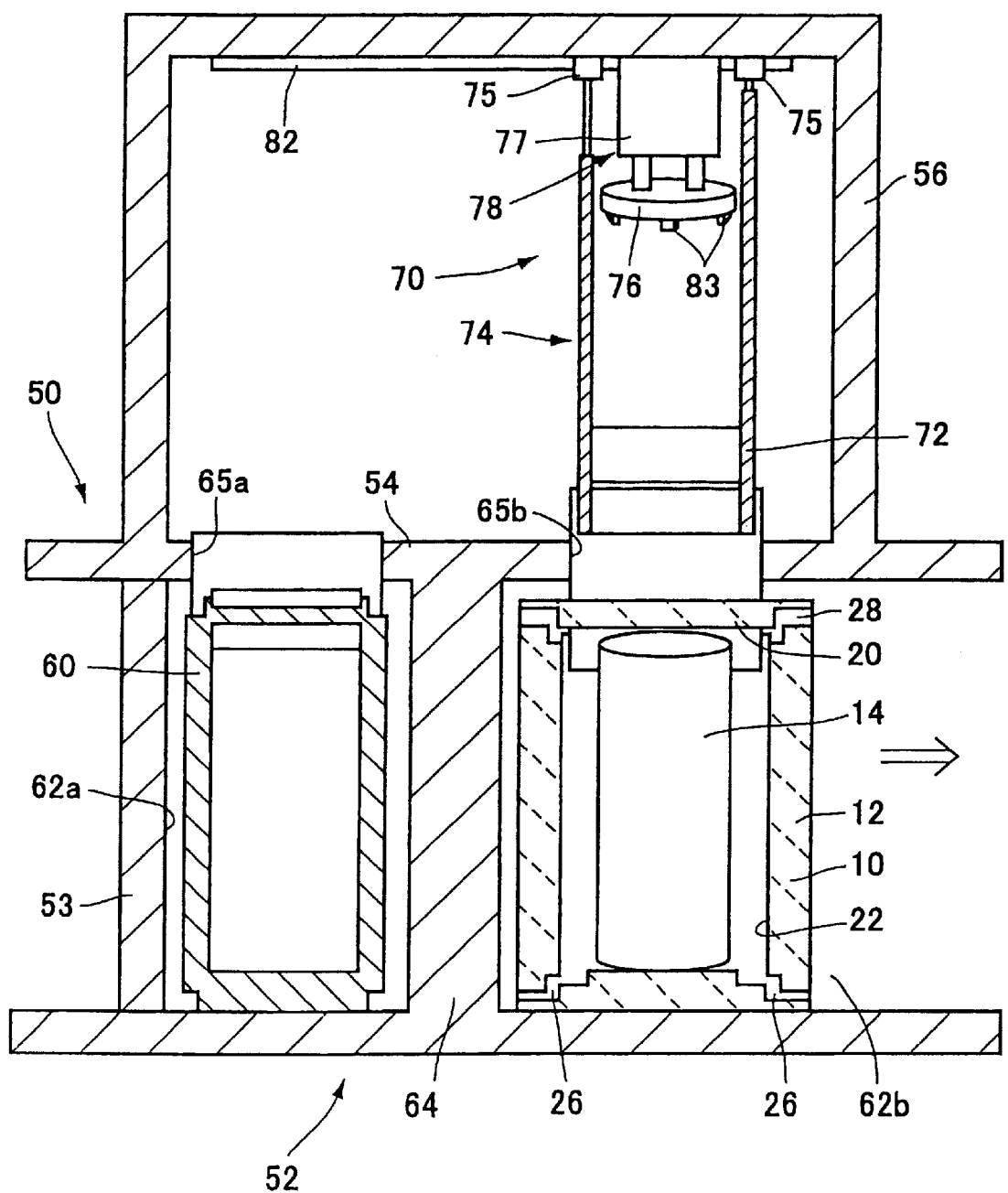
FIG. 17 is a sectional view showing a refilling process of the refilling system according to the second embodiment.

After the reduction cylinder 72 and the holding portion 76 of the second lift mechanism 78 is pulled up in this manner, a lid 20 is attached to the top opening of the container body 12 of the concrete cask 10 to close it, as shown in FIG. 17. Thereupon, loading operation for the canister 14 is finished. After the loading operation is finished, a movable wall 85 of the container stage portion 52 is moved to open the second stage portion 62b, and the concrete cask 10 that is loaded with the canister 14 is carried out.

In taking out the canister 14 from the concrete cask 10 and transferring it to the transportation cask 60, on the other hand, the aforementioned loading processes are followed in reverse. More specifically, the reduction cylinder 72 is inserted into the storage portion 22 of the container body 12 of the concrete cask 10 and located in its down position. Thereafter, the canister 14 is pulled up through the top opening of the reduction cylinder 72 by means of the second lift mechanism 78. After the canister 14 pulled up in this manner is transported to the position over the transportation cask 60, it is loaded into the transportation cask. Thereafter, the reduction cylinder 72 is pulled up from the storage portion 22, and the top opening of the container body 12 is closed by means of the lid 20, whereupon unloading operation for the canister 14 is finished.

According to the refilling system constructed in this manner and a refilling method, the reduction cylinder 72 is previously set in the storage portion 22 of the concrete cask 10 before the canister 14 is loaded into and unloaded from the storage portion 22. When the reduction cylinder 72 is set in the storage portion 22, a space having a diameter smaller than that of the storage portion is defined in the storage portion by the reduction cylinder. Thus, the gap between the outer surface of the canister 14 that passes through the reduction cylinder 72 and the inner surface of the reduction cylinder is narrower than the gap between the inner surface of the storage portion 22 and the canister 14. Air in the reduction cylinder is discharged to the outside through this narrow gap only. If the canister 14 falls during the refilling operation for the canister 14, therefore, the air that passes through the gap between the inner surface of the reduction cylinder 72 and the outer surface of the canister 14 has high resistance and acts as an air damper, so that the falling speed of the canister 14 can be reduced considerably. Thus, if the canister 14 falls owing to any accident or the like, impact that acts on the canister can be lowered to prevent breakage of the canister. In consequence, an accident such as leakage of radiation during the refilling operation can be prevented, and the reliability and safety can be improved.

The following is a description of a storage container refilling system according to a third embodiment of this invention.

Figure 18A:
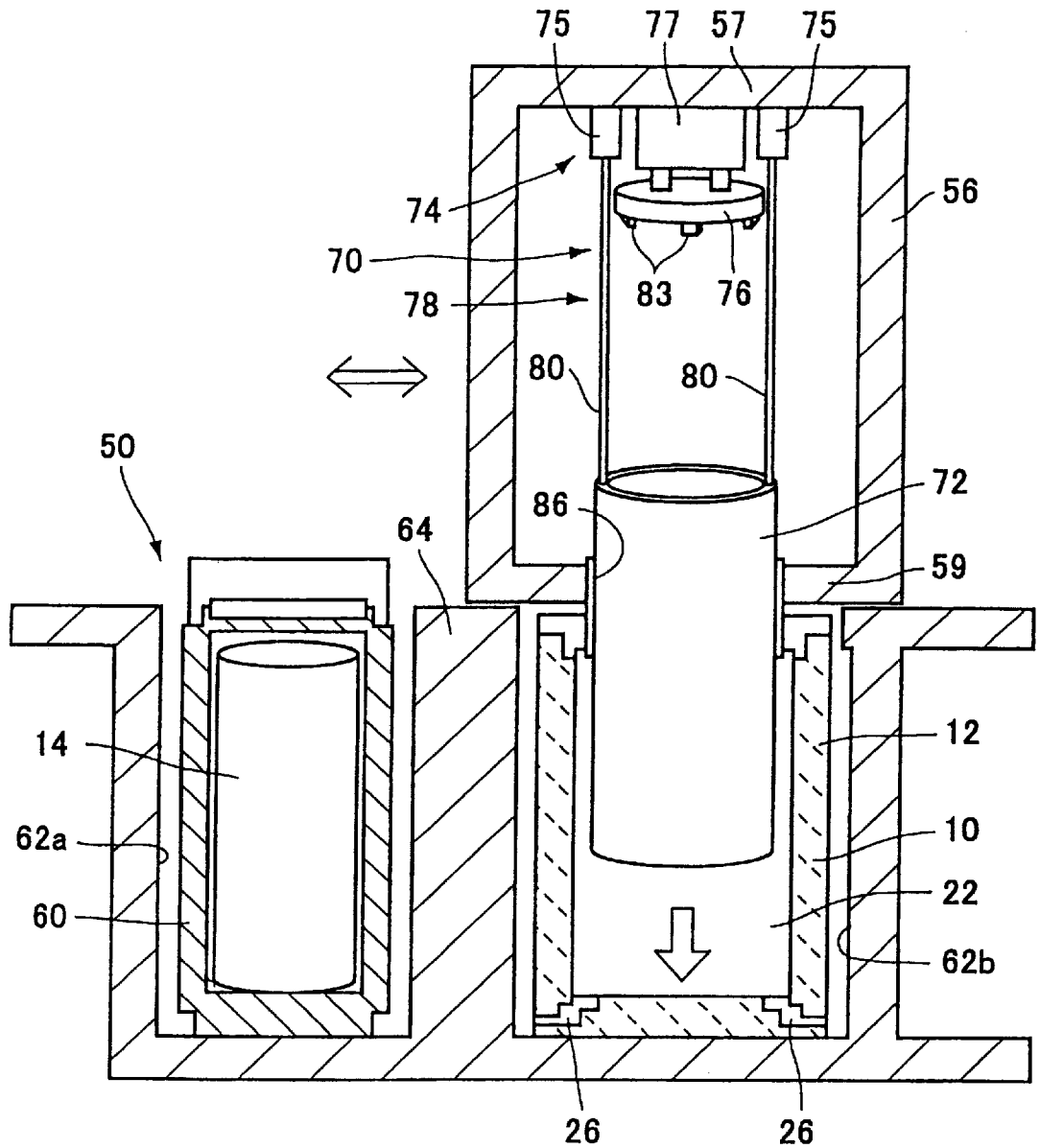
FIGS. 18A and 18B are sectional views showing a storage container refilling system according to a third embodiment of this invention.
Figure 18B:
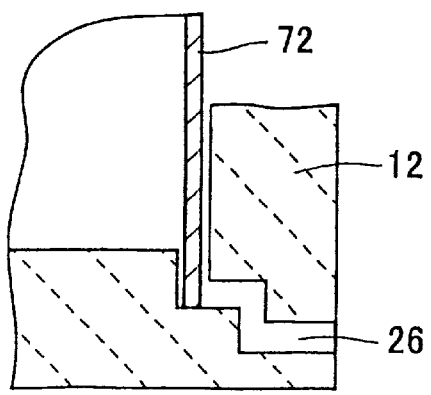

As shown in FIGS. 18A and 18B, the refilling system comprises a building 50 that is formed of concrete walls, for example. The building 50 is provided with a container stage portion 52 and a housing 56 located over the container stage portion. According to the third embodiment, the housing 56 is movable with respect to the container stage portion 52, and instead, a second lift mechanism 78 is fixed with respect to the housing.

More specifically, the container stage portion 52 has a first stage portion 62a, in which a transportation cask 60 is placed upright, and a second stage portion 62b, in which a concrete cask 10 is placed upright. The first and second stage portions 62a and 62b are situated side by side, and are divided from each other by means of a vertical partition wall 64. Further, the first stage portion 62a and the second stage portion 62b open individually upward.

The housing 56 has a bottom wall 59 that adjoins and faces the container stage portion 52. This bottom wall is formed having an inlet opening 86 and is provided with a shutter 88 (mentioned later) for opening and closing the inlet opening 86. The housing 56 is movable between a first position in which the inlet opening 86 faces the first stage portion 62a and a second position (illustrated) in which the inlet opening 86 faces the second stage portion 62b.

Further, the housing 56 contains therein a first lift mechanism 74, a reduction cylinder 72, and the second lift mechanism 78. The reduction cylinder 72 can ascend and descend through the inlet opening 86. A drive portion 77 of the second lift mechanism 78 is fixed with respect to the housing 56, and holding means (not shown) capable of holding and releasing the reduction cylinder 72 is provided on the respective distal ends of wires 80. The first lift mechanism 74, reduction cylinder 72, and second lift mechanism 78 are constructed in the same manner as those of the foregoing second embodiment, so that like portions are designated by like reference numerals, and a detailed description of those portions is omitted.

In refilling a canister by means of the refilling system according to the third embodiment described above, the transportation cask 60 that is transported from a nuclear power plant or the like is first placed upright in the first stage portion 62a, while the concrete cask 10 is placed upright in the second stage portion 62b, as shown in FIG. 18. As this is done, the reduction cylinder 72 is held in its up position in the housing 56, and the concrete cask 10 is unlidded beforehand.

After the housing 56 is then moved to the second position in which it faces the second stage portion 62b, the shutter 88 (mentioned later) is removed to open the inlet opening 86 of the housing. Then, a drive portion 75 of the first lift mechanism 74 is driven to lower the reduction cylinder 72 and insert it into a storage portion 22 through the inlet opening 86 and a top opening of a container body 12 of the concrete cask 10. When the lower end of the reduction cylinder 72 abuts against the inner surface of the bottom wall of the container body 12, that is, when it is inserted into its down position shown in FIGS. 18B and 19, the drive by means of the drive portion 75 is stopped.

In the down position, a bottom opening of the reduction cylinder 72 is closed by means of the bottom wall of the container body 12, while the upper end portion of the reduction cylinder is situated above exhaust vents 28 of the container body 12, and slightly projects from the top opening of the container body. Thus, a space is defined by the reduction cylinder 72 and the bottom wall of the container body 12 in the storage portion 22. This space has a diameter smaller than that of the storage portion 22, and all its area except a top opening of the reduction cylinder 72 is screened from the outside.

Figure 19:
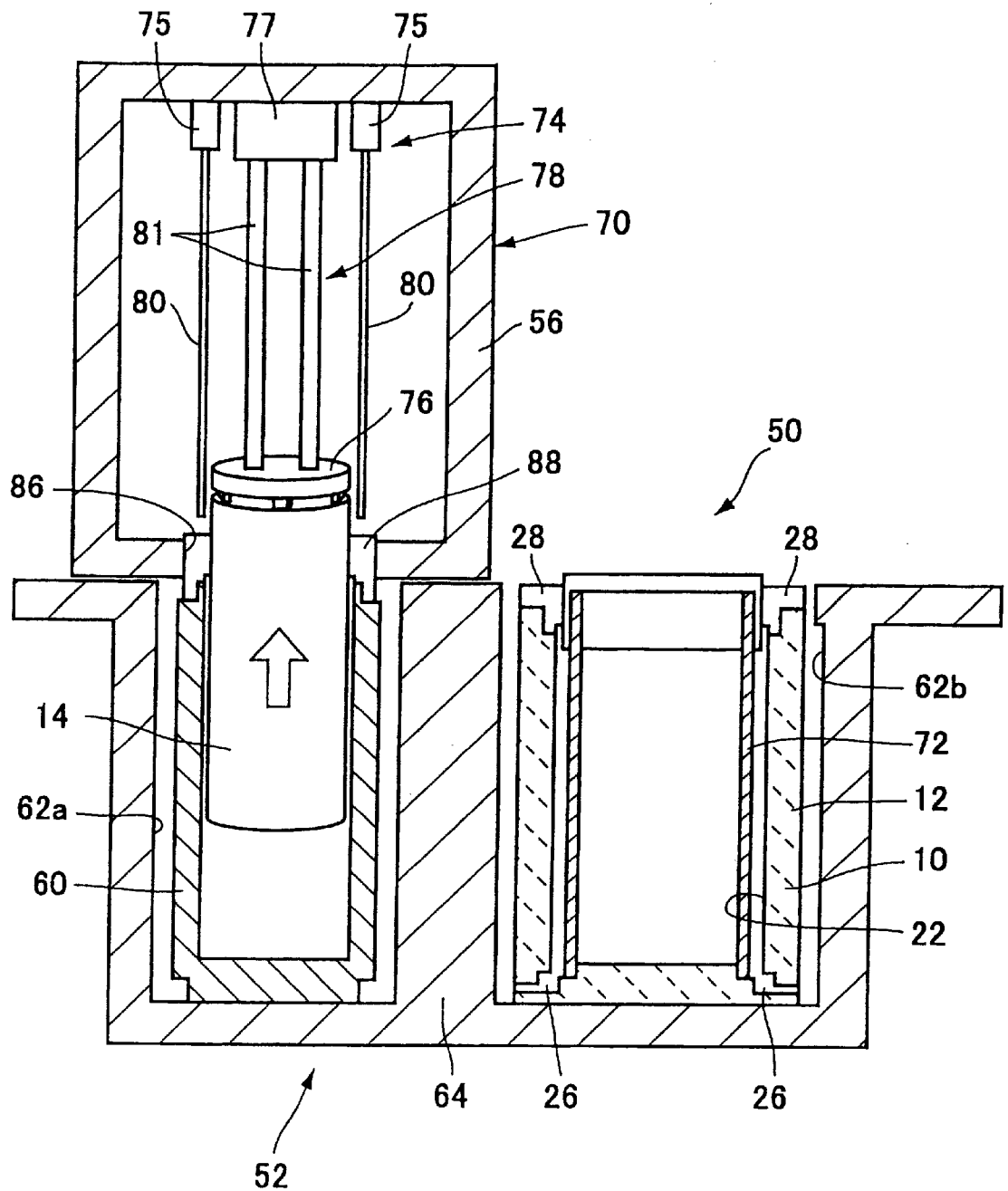
FIG. 19 is a sectional view showing a refilling process of the refilling system according to the third embodiment.

Subsequently, the reduction cylinder 72 is released from the wires 80, and the transportation cask 60 is unlidded, as shown in FIG. 19. Thereafter, the housing 56 is moved to the first position in which it faces the first stage portion 62a. In this state, the drive portion 77 of the second lift mechanism 78 is driven to lower the holding portion 76 to the upper end of the canister 14 through the inlet opening 86, and the upper end portion of the canister 14 is held by means of this holding portion. Thereafter, the holding portion 76 is pulled up together with the canister 14, and the canister 14 is taken out of the transportation cask 60 and brought into the housing 56. Further, the inlet opening 86 of the housing 56 is closed by means of the shutter 88.

Figure 20:
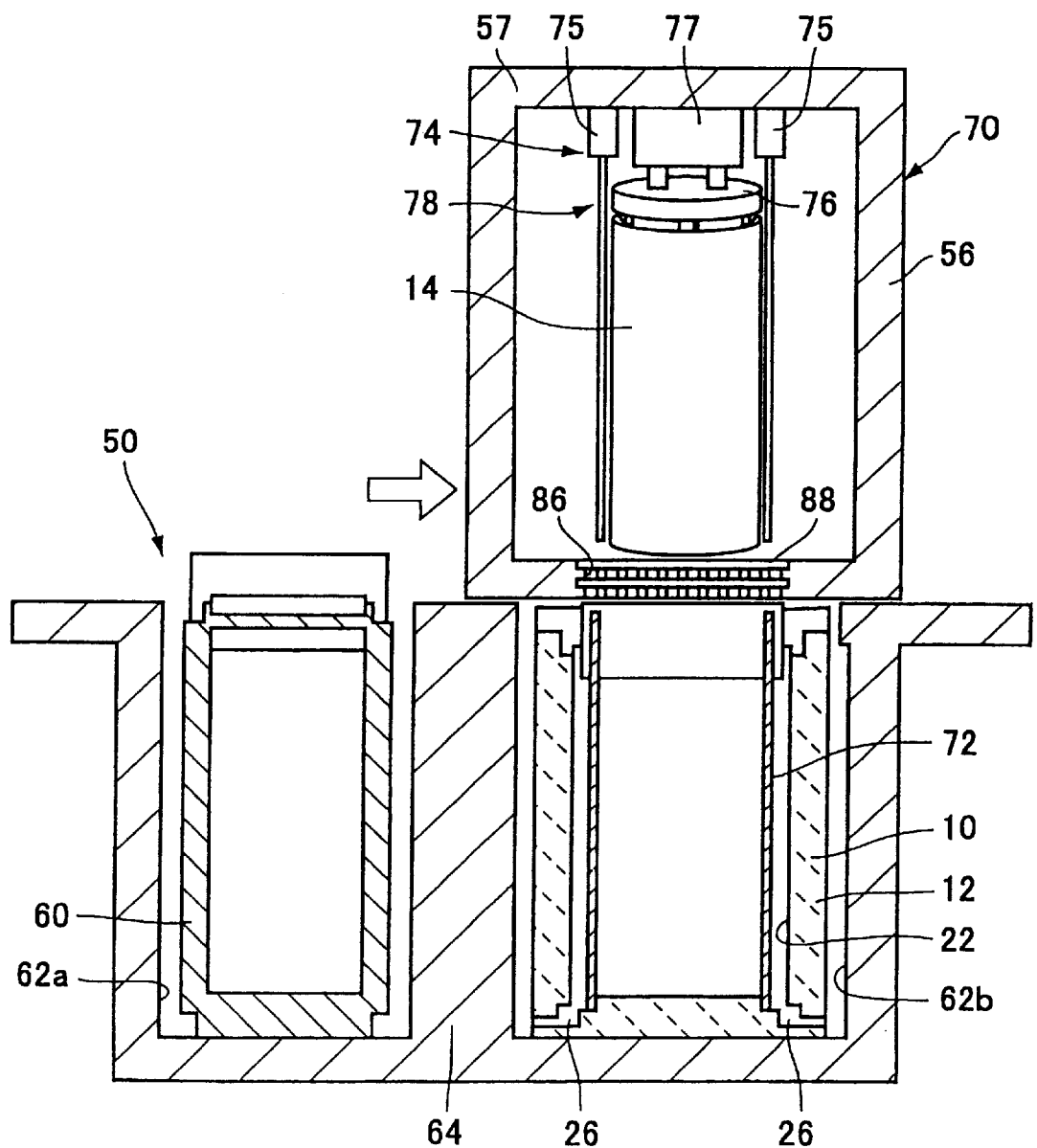
FIG. 20 is a sectional view showing a refilling process of the refilling system according to the third embodiment.

Then, the housing 56 is moved to the position in which it faces the second stage portion 62b, as shown in FIG. 20. After the canister 14 is taken out of the transportation cask 60, the transportation cask 60 is lidded.

Figure 21:
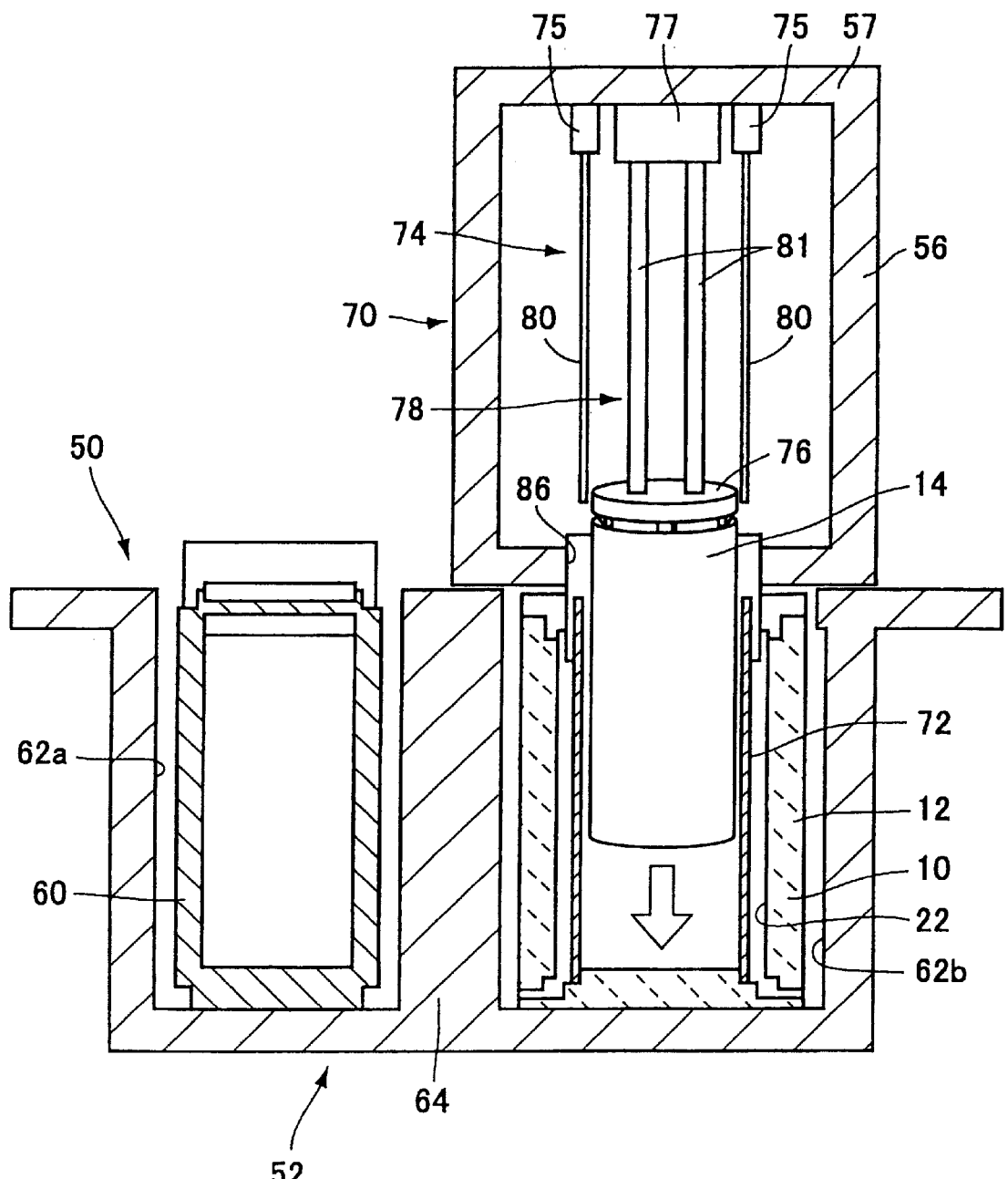
FIG. 21 is a sectional view showing a refilling process of the refilling system according to the third embodiment.

Subsequently, the shutter 88 is removed to open the inlet opening 86, as shown in FIG. 21. Thereafter, the drive portion 77 of the second lift mechanism 78 is driven to lower the holding portion 76 and the canister 14 and insert the canister 14 into the reduction cylinder 72 through the inlet opening 86 and the top opening of the reduction cylinder 72. When the lower end of the canister 14 abuts against the inner surface of the bottom wall of the container body 12, that is, when the canister 14 is stored entire in the storage portion 22 of the concrete cask 10, the drive by means of the drive portion 77 is stopped.

Figure 22:
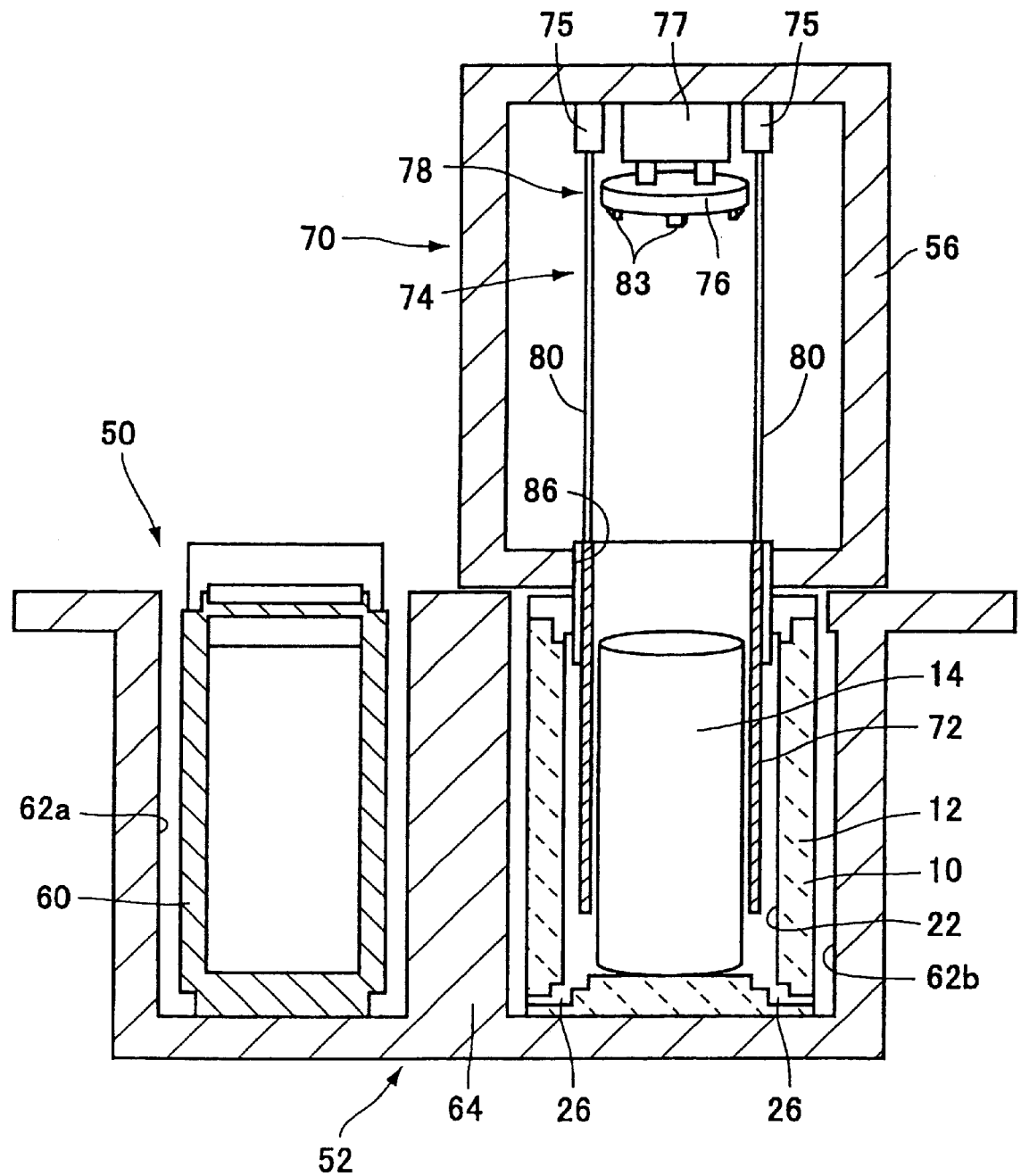
FIG. 22 is a sectional view showing a refilling process of the refilling system according to the third embodiment.
Figure 23:
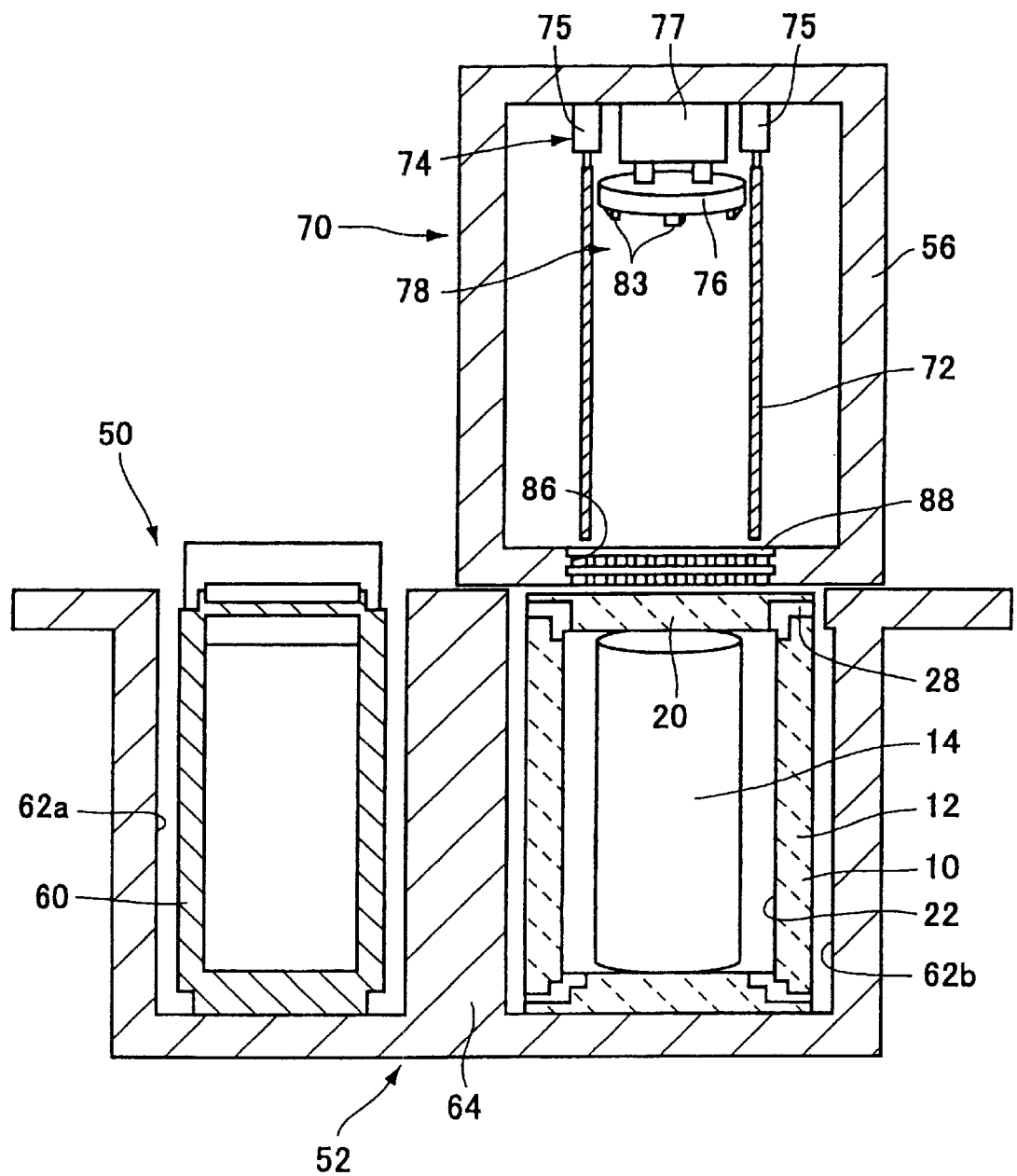
FIG. 23 is a sectional view showing a refilling process of the refilling system according to the third embodiment.

Thereafter, the second lift mechanism 78 releases the canister 14 from the hold by means of the holding portion 76, and drives the drive portion 75 to pull up the holding portion 76 into the housing 56, as shown in FIG. 22. At the same time, the first lift mechanism 74 supports the reduction cylinder 72 by means of the wires 80, and then drives the drive portion 75 to pull up the reduction cylinder 72 from the storage portion 22 of the concrete cask 10 and bring it into the housing 56, as shown in FIG. 23. Further, the inlet opening 86 of the housing 56 is closed by means of the shutter 88, and a lid 20 is attached to the top opening of the container body 12 of the concrete cask 10 to close it, whereupon the loading operation for the canister 14 is finished.

In taking out the canister 14 from the concrete cask 10 and transferring it to the transportation cask 60, on the other hand, the aforementioned loading processes are followed in reverse. More specifically, the reduction cylinder 72 is inserted into the storage portion 22 of the container body 12 of the concrete cask 10 and located in its down position. Thereafter, the canister 14 is pulled up through the top opening of the reduction cylinder 72 by means of the second lift mechanism 78. After the canister 14 pulled up in this manner is stored in the housing 56 and transported to the position over the transportation cask 60, it is loaded into the transportation cask. Thereafter, the reduction cylinder 72 is pulled up from the storage portion 22, and the top opening of the container body 12 is closed by means of the lid, whereupon unloading operation for the canister 14 is finished.

Also in the refilling system and a refilling method according to the third embodiment arranged in this manner, the reduction cylinder 72 is previously set in the storage portion 22 of the concrete cask 10 before the canister 14 is loaded into and unloaded from the storage portion 22. When the reduction cylinder 72 is set in the storage portion 22, a space having a diameter smaller than that of the storage portion is defined in the storage portion by the reduction cylinder. Thus, the gap between the outer surface of the canister 14 that passes through the reduction cylinder 72 and the inner surface of the reduction cylinder is narrower than the gap between the inner surface of the storage portion 22 and the canister 14. Air in the reduction cylinder is discharged to the outside through this narrow gap only. If the canister 14 falls during the refilling operation for the canister 14, therefore, the air that passes through the gap between the inner surface of the reduction cylinder 72 and the outer surface of the canister 14 has high resistance and acts as an air damper, so that the falling speed of the canister 14 can be reduced considerably. Thus, if the canister 14 falls owing to any accident or the like, impact that acts on the canister can be lowered to prevent breakage of the canister. In consequence, an accident such as leakage of radiation during the refilling operation can be prevented, and the reliability and safety can be improved.

This invention is not limited to the embodiments described above, and various changes may be effected therein without departing from the scope of this invention.

In the embodiments described above, for example, the container body of the concrete cask is cylindrical. Alternatively, however, it may be in the shape of any polygonal tube, such as a square tube or triangular tube. In this case, the same function and effect as aforethe can be obtained by shaping the canister, speed reducing member, and reduction cylinder corresponding to the container body of the concrete cask.

In the refilling system, moreover, the respective configurations of the holding portions, drive portions, etc. of the first and second lift mechanisms are not limited to the foregoing embodiments, and may be selected variously as required. Further, the cask as an object of canister refilling is not limited to a concrete cask, and may be any other storage container.

According to this invention, as described in detail herein, there may be provided a storage container, a storage container refilling system, and a refilling method, in which breakage of a closed container can be prevented to ensure improved safety and reliability if the closed container falls during refilling operation for the closed container or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage container for storing a closed container having a radioactive substance sealed therein, comprising:
   a container body having a storage portion for storing the closed container and a top opening through which the closed container is loaded into and unloaded from the storage portion;
   a lid closing the top opening of the container body;
   a heat removing portion having intake vents in a bottom portion of the container body, exhaust vents in a top portion of the container body, and a cooling air passage defined between an inner surface of the storage portion and an outer surface of the closed container stored in the storage portion, the heat removing portion being configured to cause air introduced into the container body through the intake vents to flow into the cooling air passage so as to remove heat from the radioactive substance, and discharge the air through the exhaust vents;
   closing members configured to close the intake vents and exhaust vents as the closed container is loaded into and unloaded from the storage portion; and
   a speed reducing portion provided at the top opening of the container body and having a through hole through which the closed container can be passed, the through hole having a dimension smaller than the dimension of the storage portion and larger than the outside dimension of the closed container.

2. A storage container according to claim 1, wherein the speed reducing portion is removably fitted to the top opening of the container body.

3. A storage container according to claim 1, wherein the speed reducing portion is formed integrally with the container body.

4. A storage container according to claim 1, wherein the speed reducing portion has a groove formed on the inner surface of the through hole so as to be substantially coaxial with the through hole.

5. A storage container according to claim 1, wherein each of the closing members is removably attached to the container body.

6. A storage container according to claim 1, wherein each of the closing members is attached to the container body to be movable between a position in which the closing member closes the intake vent or exhaust vent and a position in which the closing member opens the intake vent or exhaust vent.

7. A storage container according to claim 1, wherein the container body is formed of concrete.

8. A storage container refilling system for loading a closed container having a radioactive substance sealed therein into and unloading the closed container from a storage container, which comprises a container body having a storage portion for storing the closed container and a top opening through which the closed container is loaded into and unloaded from the storage portion, a lid closing the top opening of the container body, and a heat removing portion having intake vents in the bottom portion of the container body, exhaust vents in the top portion of the container body, and a cooling air passage defined between an inner surface of the storage portion and an outer surface of the closed container stored in the storage portion, the heat removing portion being configured to cause air introduced into the container body through the intake vents to flow into the cooling air passage so as to remove heat from the radioactive substance, and discharge the heat through the exhaust vents, the storage container refilling system comprising:

a reduction cylinder having an outside dimension smaller than the dimension of the storage portion and an inside dimension larger than the dimension of the closed container and configured to be loaded into the storage portion through the top opening;

a first lift mechanism configured to raise and lower the reduction cylinder between a down position in which the reduction cylinder is set in the storage portion of the container body and an up position such that the reduction cylinder is drawn out of the storage portion; and a second lift mechanism having a holding portion for holding one end portion of the closed container and configured to raise and lower the closed container with respect to the container body, the second lift mechanism being configured to load into and unload the closed container from the storage portion of the container body with the reduction cylinder set in the storage portion.

9. A storage container refilling system according to claim 8, which further comprises a container stage portion in which the storage container and a transportation container for storing and transporting the closed container are arranged side by side, and wherein the second lift mechanism is movable between a first position over the transportation container and a second position over the storage container.

10. A storage container refilling system according to claim 9, which further comprises a housing overlying the container stage portion and movable between a first position opposite the transportation container and a second position opposite the storage container, the first and second lift mechanisms being provided in the housing, the housing having an inlet opening, adapted to be opposed to a top opening of the transportation container in the first position and opposed to the top opening of the storage container in the second position and capable of being penetrated by the reduction cylinder and the closed container, and a shutter portion for opening and closing the inlet opening and configured to store the reduction cylinder pulled up by means of the first lift mechanism and the closed container pulled up by means of the second lift mechanism.

11. A storage container refilling system according to claim 8, wherein the reduction cylinder has a bottom opening adapted to be closed by the bottom wall of the container body in the down position and a top opening situated above the exhaust vents of the container body.

12. A storage container refilling method for loading a closed container having a radioactive substance sealed therein into and unloading the closed container from a storage container, which comprises a container body having a storage portion for storing the closed container and a top opening through which the closed container is loaded into and unloaded from the storage portion, a lid closing the top opening of the container body, and a heat removing portion having intake vents in the bottom portion of the container body, exhaust vents in the top portion of the container body, and a cooling air passage defined between the inner surface of the storage portion and the outer surface of the closed container stored in the storage portion, the heat removing portion being configured to cause air introduced into the container body through the intake vents to flow into the cooling air passage so as to remove heat from the radioactive substance, and discharge the heat through the exhaust vents, the storage container refilling method comprising:

loading a reduction cylinder, having an outside dimension smaller than the dimension of the storage portion and an inside dimension larger than the dimension of the closed container, into the storage portion through the top opening of the storage container;

inserting the closed container into the reduction cylinder from above through the top opening of the reduction cylinder, thereby locating the closed container in the storage portion;

pulling up the reduction cylinder from the storage portion after locating the closed container in the storage portion; and unloading the closed container from the storage portion in a manner such that the closed container is pulled up from the storage portion after the reduction cylinder is loaded into the storage portion through the top opening of the storage container and located outside the closed container.

* * * * *